United States Patent [19]
Rasch et al.

[11] Patent Number: 5,832,155
[45] Date of Patent: Nov. 3, 1998

[54] COMBINATION SPLITTING DEVICE COMPOSED OF STRIP WAVEGUIDES AND USES THEREOF

[75] Inventors: Andreas Rasch; Matthias Rottschalk; Jens-Peter Ruske; Volker Groeber, all of Jena, Germany

[73] Assignee: LDT GmbH & Co. Laser-Display-Technologie KG, Gera, Germany

[21] Appl. No.: 718,362

[22] PCT Filed: Feb. 6, 1996

[86] PCT No.: PCT/EP96/00493

§ 371 Date: Oct. 4, 1996

§ 102(e) Date: Oct. 4, 1996

[87] PCT Pub. No.: WO96/24869

PCT Pub. Date: Aug. 15, 1996

[30] Foreign Application Priority Data

Feb. 7, 1995 [DE] Germany ............ 195 03 930.0

[51] Int. Cl.[6] .................................................. G02B 6/10
[52] U.S. Cl. .................. 385/48; 385/24; 385/45; 385/17; 385/9; 385/41; 385/14; 385/2
[58] Field of Search ................. 385/46, 24, 48, 385/45, 3, 2, 8, 9, 14, 17, 41

[56] References Cited

U.S. PATENT DOCUMENTS

| | | | |
|---|---|---|---|
| 4,917,451 | 4/1990 | Chouinard et al. | 385/2 |
| 5,109,447 | 4/1992 | Chan | 385/45 |
| 5,146,533 | 9/1992 | Bierlein et al. | 385/141 |
| 5,291,576 | 3/1994 | Nakamura | 385/142 |
| 5,355,424 | 10/1994 | Idler et al. | 385/14 |
| 5,394,489 | 2/1995 | Koch | 385/14 |

FOREIGN PATENT DOCUMENTS 3929340 5/1991 Germany.

OTHER PUBLICATIONS

"Fabrication and Charaterization of Singlemode Channel Waveguides and . . . " Rottschalk, Ruske, Horning & Rasch, SPIE 2213, 1994, pp. 152–163.
"Integrierte Optik", Karthe, Müller & Jena, Akademische Verlagsgesellschaft Geest & Portig K.–G. Leipzig, 1991.
Fabrication and Characterization of Optical Waveguides in KtiOPO$_4$, Bierlein, Ferretti, Brixner & Hsu, Appl. Phys. Lett. 50(18), Mar. 4, 1987, pp. 1216–1218.
Application of Crystals of the Ktiopo$_4$–type in the field of Integrated Optics, Shi, PHD Thesis, University of Cologne, 1992, pp. 89–101.
Proceedings of the Spie, vol. 2213, Jan. 1994, pp. 152–163, Article "Fabrication and Characterization of Singlemode Channel Waveguides and Modulators in KT10P04 for the Short Visible Wavelength Region"/ Rottschalk, et al.

*Primary Examiner*—John Ngo
*Attorney, Agent, or Firm*—McAulay Fisher Nissen Goldberg & Kiel, LLP

[57] ABSTRACT

The invention concerns an integrated-optical junction splitter, in particular for applications in the wavelength range of visible light, which ensures a spatial and wideband combination of light in a wavelength spectrum $\Delta\lambda$ greater than 75 nm (value given applies to short-wave visible light). In the case of a usable wavelength range comprising the entire spectrum of visible light, the junction splitter is a white light junction splitter. The junction splitter consists of at least three channel waveguides, at least one of which must be a single-mode integrated-optical wideband channel waveguide (SOWCW). Two channel waveguides each have a respective input and are combined into a common SOWCW at their outputs in a coupling point, which common SOWCW features a common light output at its end.

This wideband junction splitter is used as a wavelength-selective or wavelength-independent switch or modulator, in interferometric and photometric devices, sensors, and microsystem-technical solutions.

17 Claims, 18 Drawing Sheets

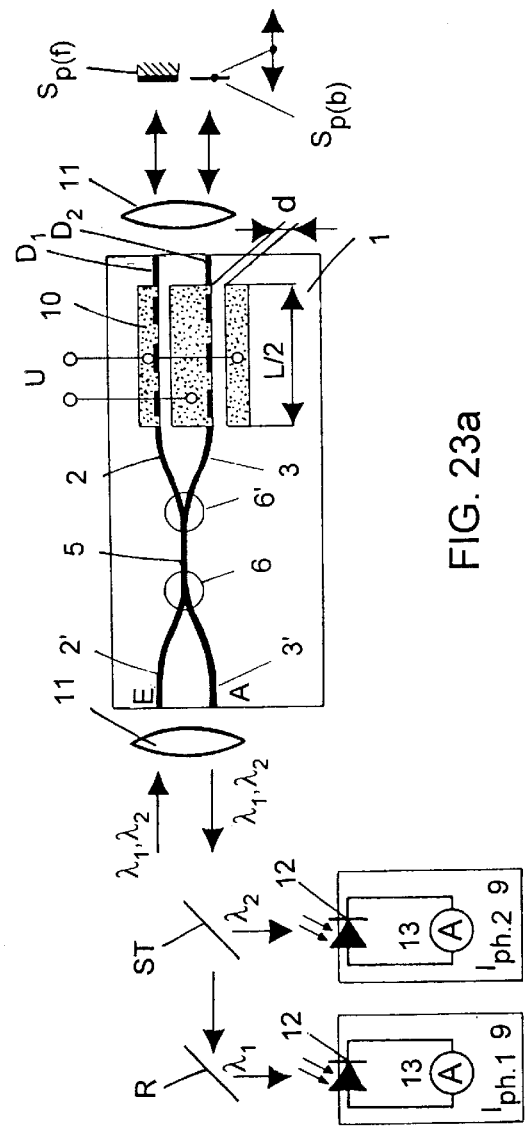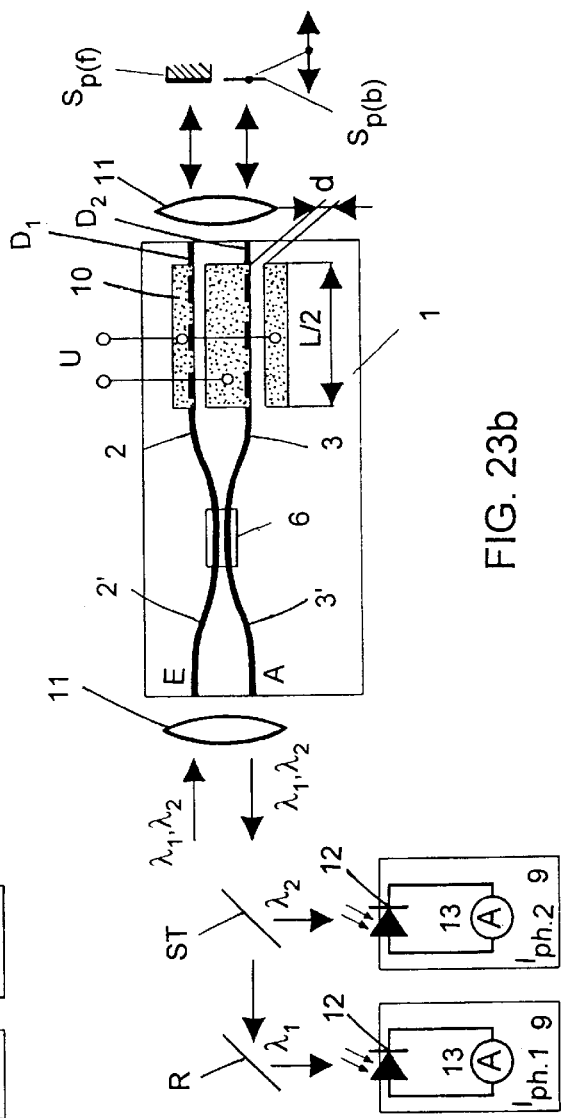
FIG. 23a
FIG. 23b

COMBINATION SPLITTING DEVICE COMPOSED OF STRIP WAVEGUIDES AND USES THEREOF

BACKGROUND OF THE INVENTION a) Field of the Invention

The invention concerns a junction splitter used for the spatial combination or splitting of light of different wavelengths or different wavelength ranges from a comparably large wavelength spectrum. If required, this wideband junction splitter is used to switch, deviate, or modulate light.

The invention also provides for applications of this wideband junction splitter. The single-mode channel waveguides used for the wideband junction splitter are single-mode integrated-optical wideband channel waveguides or white light channel waveguides described in the patent application "Channel Waveguide and Applications" submitted on the same day.

The invention is also related to the patent application "Colour Image Generation Systems and Applications".

For the purposes of this document, light refers to visible and invisible (infrared and ultraviolet) electromagnetic radiation, in particular however discrete wavelengths or wavelength ranges of visible radiation in the wavelength spectrum from 400 nm to 760 nm. The designation "channel waveguide" is applied to waveguides based on the principle of the total reflection of light, caused by an increase in the refractive index within the waveguiding region in relation to the surrounding medium.

b) Description of Related Art

Junction splitters for a bandwidth less than 95 nm (value given applies to short-wave visible light) are known. The combination of discrete channel waveguides is effected for the purpose of combining light according to the basically known principle of two-mode interference by:

using a Y-junction coupler using an integrated-optical switching or distribution element such as X-couplers, directional couplers, three-guide couplers, or BOA (see W. Karthe, R. Müller, *Integrierte Optik* (*Integrated Optics*), Akademische Verlagsgesellschaft Geest & Portig K.-G., Leipzig, 1991 and A. Neyer: "*Integriert-Optische Komponenten für die Optische Nachrichtentechnik*" (*Integrated-Optical Components for Optical Communications Technology*), habilitation thesis, University of Dortmund 1990).

BOA is a French language designation (bifurcation optique active) for a group of integrated-optical devices (see: M. Papuchon, A. Roy, D. B. Ostrowsky, "*Electrically active optical bifurcation: BOA*"; Appl. Phys. Lett., Vol. 31 (1977) pp. 266–267).

The efficiency of junction-splitting—in addition to the simultaneous requirement for efficient modulation and/or switching of the light—is dependent on the channel waveguides that provide the inputs and outputs of the junction splitter being in single-mode. The known channel waveguides for wavelength ranges with a bandwidth greater than approximately 130 nm (value given applies to short-wave visible light) are not single-mode.

Different light wavelengths require different values of the characteristic channel waveguide parameters such as the refractive index of the substrate, refractive index of the superstrate, refractive index or one- or two-dimensional refractive index profile of the channel waveguide, cross-sectional shape (e.g. width and depth), and channel waveguide position in or on the substrate. In general, this requires the use of different channel waveguides for different wavelengths of the guided light.

In the case of a junction splitting on the basis of known channel waveguides, e.g. the titanium-indiffused channel waveguide in $LiNbO_3$, the usable wavelength range reduces by approximately 35 nm, when compared against the wavelength range of the associated single-mode channel waveguide, as in junction splitters based on two-mode interference such as Y-junction couplers, directional couplers, three-guide couplers, X-couplers, or BOA, the oscillation build-up of the second mode in lateral direction in the junction or splitting area must be avoided. This is the precondition for a constant splitting ratio of the light transmission performance for junction splitter operation across the entire usable wavelength range.

To achieve efficient junction splitting of light from a wavelength range greater 95 nm, it is thus necessary to use one and the same single-mode channel waveguide which, from a technical point of view, transmits efficiently all wavelengths with a bandwidth greater than 130 nm approximately (value given applies to short-wave visible light). Transmission with a technically sufficient degree of effectiveness means that the effective refractive index $N_{eff}$ of the mode guided in the channel waveguide must be at least $5 \times 10^{-5}$ above the refractive index of the surrounding material $n_s$. This is a necessary precondition for achieving low values of waveguide attenuation in the range 1 dB/cm. Technically effective signifies furthermore that, in the entire single-mode guidable wavelength range, waveguide attenuation and the efficiency of a coupling between the channel waveguide and a single-mode optical fiber should not change by more than 30%, as light is usually coupled into the channel waveguide by means of single-mode optical fibers. Using standard channel waveguides, it is not possible to guide e.g. red and blue light in one and the same channel waveguide in single-mode and with a technically sufficient degree of effectiveness.

There is so far no known device which allows light of different wavelengths with a bandwidth greater than approximately 95 nm (value given applies to short-wave visible light) in one and the same waveguide structure, to be guided in single-mode as well as, if required, to be efficiently modulated, deviated switched, and spatially combined or split, either separately or in combination.

To this end, requirements must be met which in this form, and in combination with known modulation mechanisms such as utilizing the electro-optical effect, have not yet been implemented.

According to patent application DE 43 27 103 A1, an interferometrically adjustable optical filter is known. The optical filter splits an input signal into several waveguide branches. In each branch, the amplitude and the phase of the signal will be individually controlled. The signals will then be recombined in a waveguide.

The filter element serves as a demultiplexer for wavelength multiplex operation in telecommunications technology at wavelengths between 800 nm and 1.6 μm, and with a comparatively narrow bandwidth.

OBJECT OF THE INVENTION

This present invention is based on the primary object to combine spatially, or to split, light beams from a wide wavelength spectrum or from several discrete wavelengths with a large wavelength distance, and, if required, to modulate, deviate, and/or switch these light beams before or after, or at the point of, such spatial combination. The beam is to contain light from several wavelengths or wavelength ranges, in particular all wavelengths or certain wavelengths of a bandwidth $\Delta\lambda > 95$ nm from the visible light spectrum. For implementing wideband junction splitters, this means that there is also a requirement for wideband channel waveguides featuring a single-mode guidable wavelength range of at least 130 nm (value given applies to short-wave visible light).

For the wideband junction splitter, basically known areas of application are to be developed such that a comparatively simple construction of optical assemblies and devices becomes possible. The possibility is to be created to produce integrated-optical devices which are capable of transmitting in single-mode, modulating, and/or junction-splitting (splitting spatially or combining spatially) light across a wide wavelength spectrum.

SUMMARY

According to the invention, at least two single-mode integrated-optical channel waveguides—which do not necessarily need to be, but advantageously should be, wideband—will be combined such that a subsequent single-mode integrated-optical wideband channel waveguide, hereinafter designated as SOWCW, will pass on the spatially combined light. The SOWCW is designed according to the patent application "Channel Waveguide and Applications" submitted on the same day.

This SOWCW is capable of wide bandwidth and single-mode light transmission. Wide bandwidth signifies that the radiation of different wavelengths, in particular of the visible light spectrum, with a bandwidth of $$\Delta\lambda_w > 0.48 \times \lambda - 85 \text{ nm}$$

(where $\lambda$ and $\Delta\lambda_w$ are stated in nm) can be transmitted in single-mode with a technically sufficient degree of effectiveness.

For visible light, this means e.g. a SOWCW bandwith greater than approximately 105 nm in relation to the wavelength $\lambda = 400$ nm, and a SOWCW bandwidth greater than 130 nm in relation to $\lambda = 450$ nm (FIG. 6b).

Single-mode means that for each given wavelength within a wavelength range one and only one effective refractive index, namely the effective refractive index $N_{00}$ of the fundamental mode in the SOWCW, can be allocated (FIG. 6a).

Normally, and thus in these documents also, the mode order count starts at zero, e.g. fundamental mode $N_{00}$, first lateral mode $N_{01}$, and so on.

Light is understood here as meaning visible and invisible (infrared and ultraviolet) electromagnetic radiation. Transmission with a technically sufficient degree of effectiveness means that the effective refractive index $N_{eff}$ of the mode guided in the SOWCW must be at least $5 \times 10^{-5}$ above the refractive index of the surrounding material $n_s$, where $n_s$ designates the value of the substrate index $n_1$ or the value of the superstrate index $n_3$—whichever is higher. This is a necessary precondition for achieving low values of waveguide attenuation in the range 1 dB/cm and implementing a channel waveguide such that it can be used efficiently in technical applications.

For each given wavelength in the range between $\lambda_a$ and $\lambda_a + \Delta\lambda_w$, one and only one effective refractive index, that is the effective refractive index of the fundamental mode $N_{00}$, can be allocated. The single-mode range is determined on the one hand by the efficient oscillation build-up, from a technical point of view, of the fundamental mode $N_{00}$ at wavelength $\lambda_a + \Delta\lambda_w$, and on the other hand by the efficient oscillation build-up, from a technical point of view, of the first mode in a lateral direction $N_{01}$ or the first mode in depth direction $N_{10}$ at wavelength $\lambda_a$. The values of $\lambda_a$ and $\lambda_a + \Delta\lambda_w$ are determined by the geometric/substance parameters of the channel waveguide and the media surrounding the channel waveguide. In principle, the minimum value of the usable wavelength $\lambda_{min}$ and the maximum value of the usable wavelength $\lambda_{max}$ are determined by the optical transmission range of the materials used.

For the crystalline material $KTiOPO_4$, for example, the minimum value of the transmission range is approximately 350 nm, and the maximum value approximately 4 $\mu$m.

Technically effective signifies furthermore that, in the entire single-mode guidable wavelength range, waveguide attenuation and the efficiency of the optical coupling between the SOWCW and a single-mode optical fiber should not change by more than 30%, as light is usually coupled into the SOWCW by means of single-mode optical fibers. Using standard channel waveguides, it is not possible to guide e.g. red and blue light in one and the same channel waveguide in single-mode and with a technically sufficient degree of effectiveness. The SOWCW parameters substrate refractive index, superstrate refractive index, refractive index or one- or two-dimensional refractive index profile of the SOWCW, cross-sectional shape (width and depth, for example) and the location of the SOWCW in or on the substrate are dimensioned such that across a wide wavelength range, in particular across the entire visible light range, single-mode operation of the SOWCW is ensured (see general dimensioning regulations for integrated-optical channel waveguides in: W. Karthe, R. Müller, *Integrated Optics*, Akademische Verlagsgesellschaft Geest & Portig K.-G., Leipzig, 1991). In particular, light waves of the entire visible wavelength spectrum can be guided. Such light wave guidance in one and the same SOWCW across the entire visible spectrum will be in single-mode and, from a technical point of view, of the same effectiveness. Thus, this is a real single-mode white light channel waveguide.

The SOWCW according to this invention are characterized by the specifically adapted processes for their fabrication and by their specific characteristics. The physical requirements in relation to the substrate material are: production of narrowly delimited structures in a lateral direction (e.g. by making use of a diffusion anisotropy during ion exchange), and/or a wavelength dependence (dispersion) of the refractive index increase $n_2 - n_s$ necessary for wave guidance (in relation to the material surrounding the SOWCW) according to the following formula:

$$\frac{d(n_2 - n_s)}{d\lambda} \geq 0,$$

where $n_s = n_1$, if $n_1 > n_3$ or $n_s = n_3$, if $n_3 > n_1$,
where $n_2$ designates the surface refractive index of the waveguiding region.

The SOWCW is produced according to one of the following processes:
  ion exchange or ion indiffusion in dielectric crystals such as $KTiOPO_4$ (KTP), $LiNbO_3$, and $LiTaO_3$,
  ion exchange in glass,
  injection molding, stamping or centrifugal processes with polymers on suitable substrates such as Si, this will produce rib or inverted rib or Petermann waveguides,
  SOWCW in II–VI or III–V semiconductor materials, fabricated by epitaxial depositing processes on suitable substrates such as $SiO_2$, SOWCW in II–VI or III–V semiconductor materials, fabricated by doping or alloying, SOWCW in heterostructures of ternary or quaternary II–VI or III–V semiconductor materials, Rib or inverted rib or Petermann waveguides in II–VI or III–V semiconductor materials, SOWCW in and on a suitable substrate material, preferably Si, by combining Si, $SiO_2$, SiON layers and/or other oxidic and/or nitride layers, Sol-Gel processes on suitable substrate materials (S. Pelli, G. C. Righini, A. Verciani: *"Laser writing of optical waveguides in sol-gel films"*, SPIE 2213, *International Symposium on Integrated Optics*, pp. 58–63, 1994), ion implantation in all above-mentioned materials.

The processes for manufacturing optical channel waveguides, in particular ion exchange and ion indiffusion in dielectric crystals, or ion exchange in glass, can be combined advantageously with the ion implantation process to obtain narrowly delimited structures.

To manufacture a wideband junction splitter according to this invention, a minimum of three channel waveguides from which at least one is a SOWCW will be combined such that a combination, splitting, switching, deviation, or modulation of light becomes possible. This can be effected by using integrated-optical devices on the basis of two-mode interference such as Y-junction couplers, X-couplers, directional couplers, three-guide couplers, or BOA (in: W. Karthe, R. Müller, *Integrierte Optik* (*Integrated Optics*), Akademische Verlagsgesellschaft Geest & Portig K.-G. Leipzig, 1991). Furthermore, integrated-optical or micro-optical reflectors (mirrors, gratings, prisms) may be used for junction-splitting.

The minimum of one SOWCW of the wideband junction splitter is to be designed such that light from a wide wavelength range is guided in single-mode according to the formula $$\Delta\lambda_w > 0.48 \times \lambda - 85 \text{ nm}$$

(where $\lambda$ and $\Delta\lambda_w$ are stated in nm), in particular light of discrete wavelengths or discrete narrow wavelength ranges from the entire visible spectrum.

The wideband junction splitter is dimensioned by its geometrical and optical parameters such that an efficient operation across a wide wavelength range, according to the formula $$\Delta\lambda_v > 0.27 \times \lambda - 34 \text{ nm}$$

(where $\lambda$ and $\Delta\lambda_v$ are stated in nm) is ensured. In relation to the wavelength $\lambda=400$ nm this means that, e.g., there is an efficient junction-splitting in a wavelength range $\Delta\lambda_v > 75$ nm.

Preferably, wideband junction splitters enable efficient junction-splitting of the light across the entire visible wavelength spectrum, in particular blue and red light simultaneously. With a junction-splittable bandwidth corresponding to the entire wavelength spectrum of visible light, there is a real white light junction splitter.

In integrated-optical devices based on two-mode interference, there is a second criterion in relation to determining the wideband characteristic vis-à-vis the SOWCW, which criterion will restrict the usable bandwidth. To ensure efficient operation, that is for example, a constant splitting ratio in splitting operation when the wavelength is varied, or a high extinction ratio in junction operation in integrated-optical interferometers, the oscillation build-up of the second lateral mode $N_{02}$ is to be prevented in the widened coupling area.

The usable bandwidth $\Delta\lambda_N$ of the junction splitter will thus be determined, on the one hand, by the lesser value of the difference between the wavelength of the fundamental mode $N_{00}$ oscillation build-up in the channel waveguide and the first lateral or depth mode ($N_{01}$ or $N_{10}$) in the channel waveguide ($\Delta\lambda_w$), and on the other hand by the difference between the fundamental mode $N_{00}$ oscillation build-up in the channel waveguide and the second lateral mode $N_{02}$ in the widened coupling area ($\Delta\lambda_v$), that is by the lesser value of either $\Delta\lambda_v$ and $\Delta\lambda_w$ (FIG. 6a). The wideband junction splitter according to the invention is advantageously used for combining light from a wide spectrum range, in particular from the entire visible light spectrum range, in a common SOWCW. In an advantageous further application of the invention, all channel waveguides of the wideband junction splitter are SOWCW.

If required, a coupling point may be actively influenced. To this end, the coupling point is designed as a controllable unit for the combination of beams and/or deviation of beams. If required, the wideband junction splitter comprises a modulation device for converting a suitable, generally electric, input signal into an optical amplitude or intensity signal, which allows separate active control of the light from two or more light sources or wavelengths up to very high control frequencies (into the GHz range, according to the current state of the art).

The amplitude or intensity-modulation of the light is implemented according to one of the following principles:

electro-optical light modulation by means of an integrated-optical interferometer structure, acousto-optical light modulation by means of an integrated-optical interferometer structure, thermo-optical light modulation by means of an integrated-optical interferometer structure, magneto-optical light modulation by means of an integrated-optical interferometer structure, opto-optical light modulation by means of an integrated-optical interferometer structure, photo-thermal light modulation by means of an integrated-optical interferometer structure, modification of the effective refractive index by injection or depletion of free charge carriers in semiconductor materials, in connection with an integrated-optical interferometer structure, electro-optical, acousto-optical, thermo-optical, magneto-optical, opto-optical, or photo-thermal modulation using the Fabry-Perot effect, modulation by changing the effective refractive index by means of injection or depletion of free charge carriers in semiconductor materials, using the Fabry-Perot effect, electro-optical, acousto-optical, thermo-optical, magneto-optical, opto-optical, or photo-thermal cut-off modulation, cut-off modulation on the basis of the change in the effective refractive index as a result of the injection or depletion of the free charge carriers in semiconductor materials, controllable waveguide amplification controllable polarization conversion in conjunction with a polarizing device or polarizing waveguide, waveguide mode conversion, electro-absorption modulation, modulation with the assistance of an integrated-optical switching or distributor element, such as an X-coupler, three-guide coupler, directional coupler or BOA, modulation of the light source itself, or modulation by modifying the coupling efficiency between light source and waveguide.

At the coupling point, a spatial combination and/or splitting and/or deviation of light components and/or beam deflection is effected in the passive case, and, additionally, a modulation or switching of light components in the active case.

The wideband junction splitter can be operated so advantageously that light from light sources of different wavelengths may be injected consecutively into the relevant channel waveguide or SOWCW, and in the junction point, the light components are spatially combined, and in the common SOWCW the consecutive light components are modulated (time multiplex operation).

In principle, all materials may be considered for use as substrate materials, in which it is possible to produce SOWCW meeting the above-mentioned requirements, and which, if necessary, provide an option for the conversion of a modulating input signal into a modulated optical amplitude- or intensity signal.

The invention refers to the use of a wideband junction splitter in devices requiring light of several wavelengths to be guided simultaneously within a usable wavelength range of several 100 nm in a SOWCW, and where a provision for controlling the amplitude or intensity of the light is required for the purposes of color mixing, measurement technology, sensor technique, photometry, and spectroscopy, e.g. by utilizing interferometric measuring methods providing the basis for a new multi-functional microsystem-technical device family.

The use of SOWCW in conjunction with modulation mechanisms provides the basis for new integrated-optical detection and spectroscopy methods operating interferometrically (for example), and creates the possibility of using several wavelengths from a wide wavelength range simultaneously or consecutively in a SOWCW, and without such use being limited to just the visible spectrum of electromagnetic radiation.

This advantages of the invention consist of the possibility to manufacture devices and, for instance, electro-optical modules that can be produced by mass production means and allow miniaturization of their dimensions.

By means of the invention, it is possible to integrate on a mount, monolithically or in hybrid fashion, light sources, junction-splitting, and/or junction combination, control, and detection.

For analysis instruments, the integrated-optical implementation of the measurement setups favors a miniaturized design; in addition, the smallest sample quantities will be sufficient for analysis.

These smallest sample quantities may be used and still a very high measurement precision maintained, as the interaction window must only be a fraction wider than the SOWCW and the length of the interaction window can be within the millimeter range.

By means of the measurement setups, all physical, biological, and chemical quantities of gases, liquids, and solids influencing the behavior of the guided light or the behavior of the channel waveguide itself can be measured, for instance by detecting any changes in absorption, refractive index, or diffusion in the SOWCW.

And for a given measurement setup, containing a wideband junction splitter, several wavelengths or at least one wavelength range can be freely selected from a wide wavelength spectrum.

The wideband junction splitter according to the invention offers the following advantages:

single-mode wideband transmission of light;

within the technical meaning, effective light modulation and/or switching capability into the GHz range (according to the current state of the art);

depending on requirements, it is possible to select a wavelength-dependent modulation device, or a modulation device independent of wavelength (e.g. electro-absorption modulation, light source modulation, wedge filter);

low electro-optical modulation voltages (some volts) in comparison to volume-optical Pockels or Kerr cells (some 100 volts), thus good combination possibilities with processes, structures, and devices in microelectronics;

when using $KTiOPO_4$ (KTP) as a substrate material, high optical performance densities can be guided in the SOWCW without any interfering phase alterations, that is, there is a high resistance of the material against a light-induced alteration of the refractive index.

BRIEF DESCRIPTION OF THE DRAWINGS

Below, the invention will be described by means of figures. These show.

DESCRIPTION OF THE PREFERRED EMBODIMENTS

FIG. 1 shows the basic design types of a wideband junction splitter. The characteristics of a known titanium-indiffused channel waveguide in LiNbO$_3$, and a standard junction splitter based on such channel waveguides, are illustrated in FIG. 2 and in FIG. 3. This is contrasted with the characteristics of a singlemode integrated-optical wideband channel waveguide (SOWCW), according to this invention, and a wideband junction splitter according to this invention, which characteristics are illustrated in respect of their bandwidths, using a rubidium⇌potassium ion exchanged channel waveguide in KTiOPO$_4$ (KTP), in FIG. 4 and FIG. 5.

Figure 3:
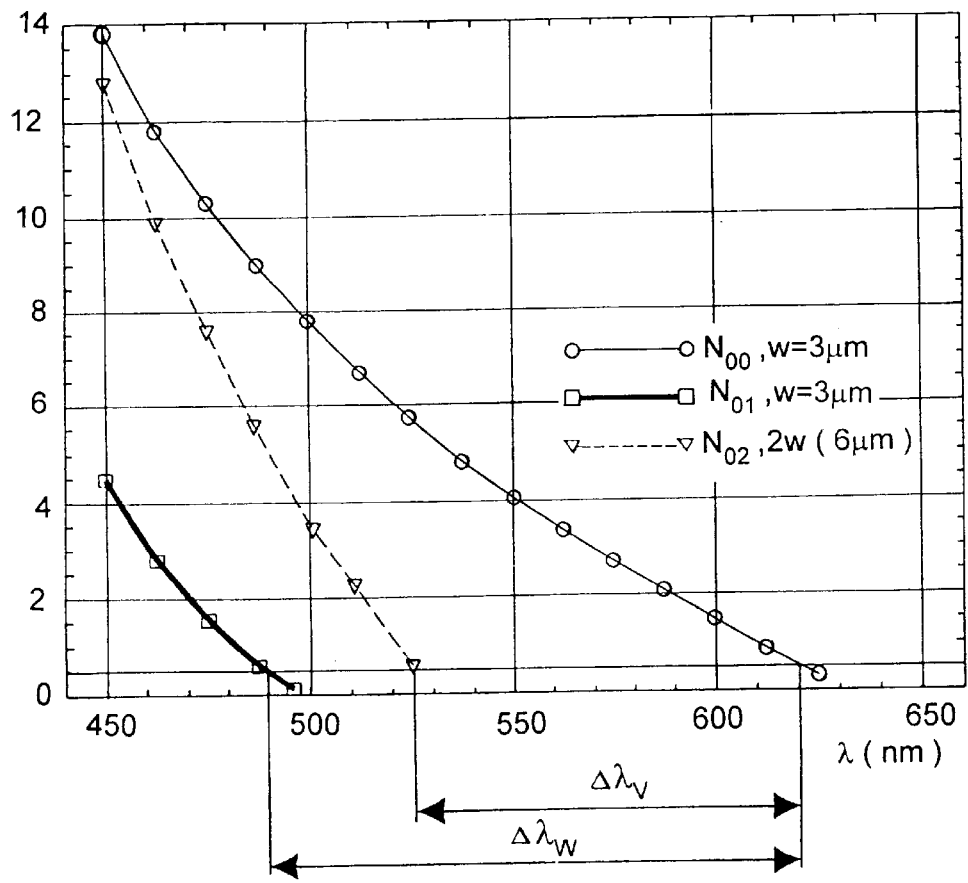
FIG. 3: Bandwidth of the $Ti:LiNbO_3$ junction splitter
Figure 5:
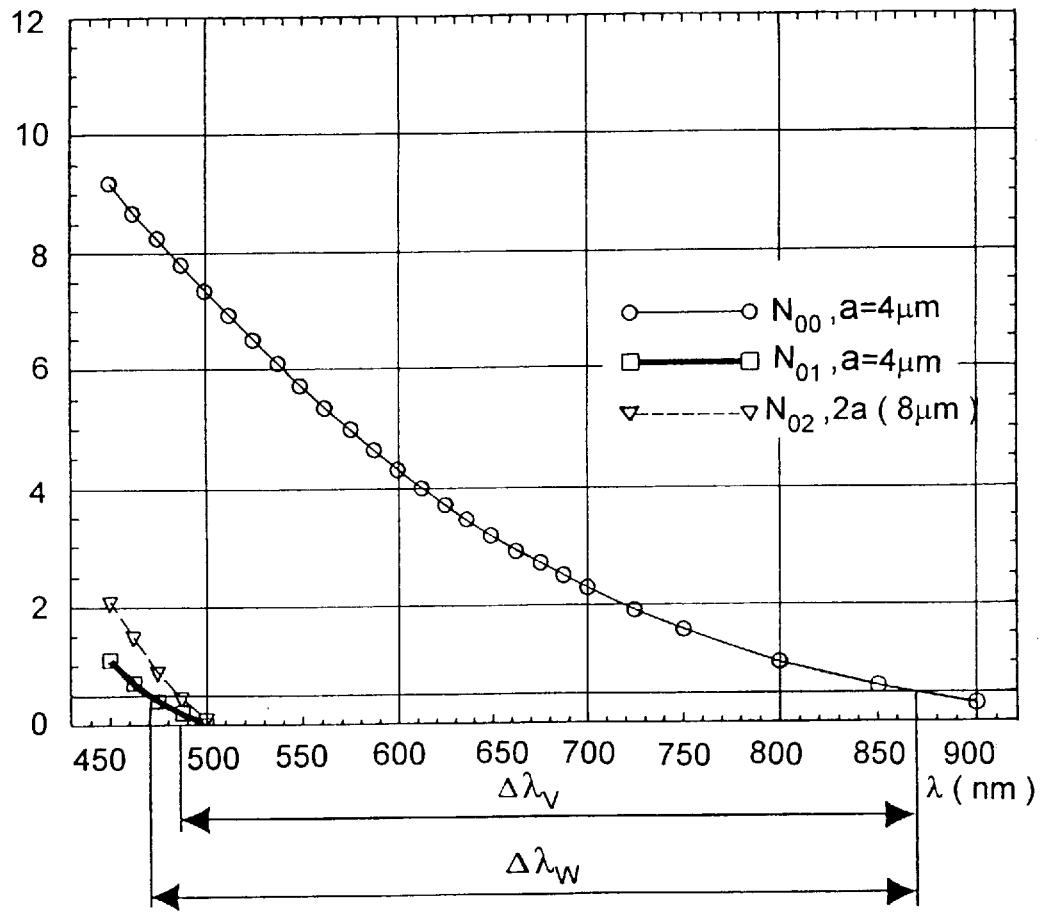
FIG. 5: Bandwidth of the Rb:KTP wideband junction splitter

In FIG. 3, as well as in FIG. 5, the illustration type selected is the effective refractive index $N_{eff, z}$ of the mode in the channel waveguide, in relation to the value of the refractive index of substrate $n_1$ as a function of wavelength $\lambda$. Each channel waveguide mode can be allocated an effective refractive index $N_{eff}$ between the surface refractive index $n_2$ and $n_1$ or $n_3$ (refractive index of the superstrate), whichever is the higher value.

The value of $N_{eff}$ depends on the wavelength, the substrate, the superstrate and waveguide refractive indices, or refractive index profiles, and the waveguide geometry. Each mode with index ik (i, k≧0, integer) will thus be illustrated in the diagrams by means of its effective refractive index as a line $N_{ik}$, where i symbolizes the order of the depth modes, and k the order of the lateral modes. The channel waveguide is single-mode, if, for a given wavelength from a wavelength range, one and only one effective refractive index, namely the effective refractive index $N_{00}$ of the fundamental mode, can be allocated.

For sufficient guiding of the light, from a technical point of view, the effective refractive index of the relevant mode must be at least $5 \times 10^{-5}$ above $n_1$ and/or $n_3$. The bandwidth can thus be read off directly.

Figure 6A:
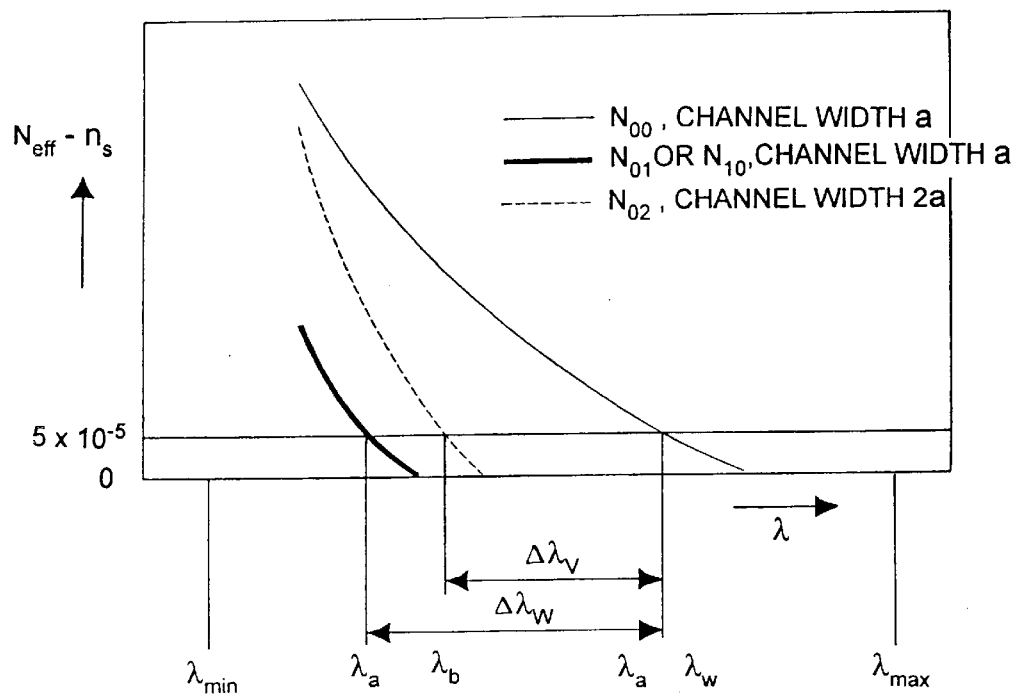
FIG. 6: General illustration of the technically relevant wavelength range for efficient junction-splitting, as well as general illustration of the wavelength dependency of efficient junction-splitting

FIG. 6a is a generalized description of the single-mode, and technically seen, efficiently guidable wavelength range in the channel waveguide as well as of the wavelength range of an efficient junction-splitting in a junction splitter.

Figure 6B:
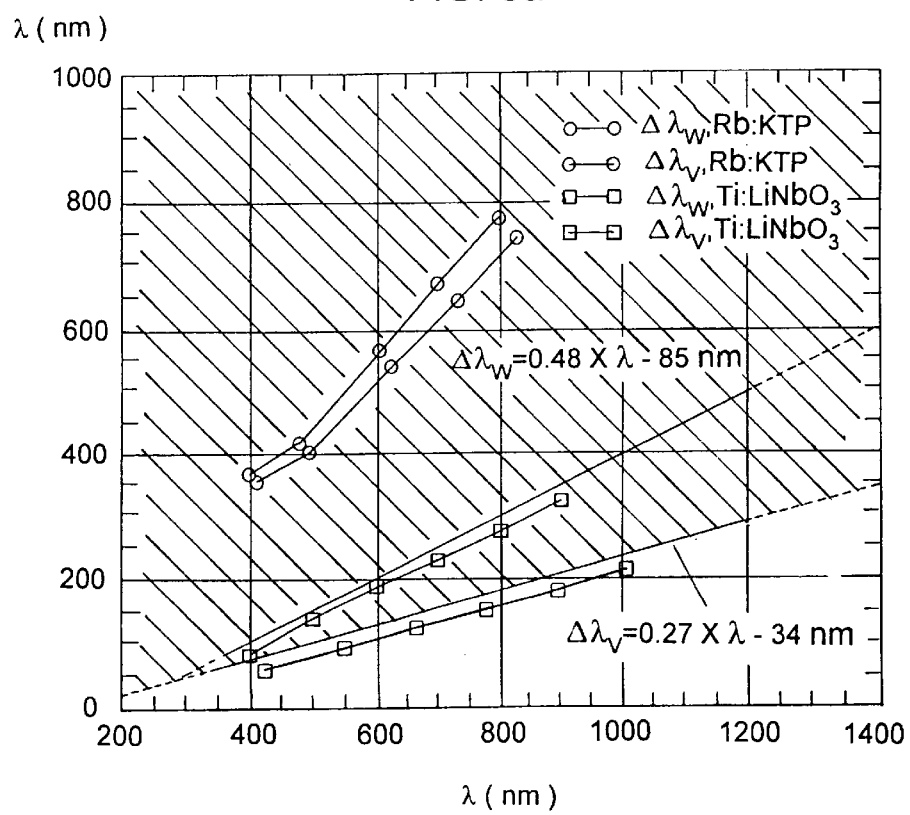

FIG. 6b shows the single-mode guidable wavelength range of the channel waveguide, as well as the wavelength range of the efficient junction-splitting, for SOWCW according to the invention in rubidium⇌potassium ion exchanged KTiOPO$_4$ (KTP), as well as for standard titanium-indiffused channel waveguides in LiNbO$_3$, respectively in direct dependence of the wavelength λ itself.

In addition, in FIG. 6b the area of the SOWCW and wideband junction splitter according to this invention will be delimited in general from current state-of-the-art channel waveguides and junction splitters.

FIG. 1 first shows the basic design types of a wideband junction splitter.

FIG. 1 shows single-mode integrated-optical wideband channel waveguides (hereinafter designated as SOWCW) 2, 3, and 5 embedded into a substrate material 1. The SOWCW 2 and 3 each have a respective input E$_1$ and E$_2$. At their outputs A$_1$ and A$_2$, they are combined in a coupling point 6 and will be continued as a combined SOWCW 5 to a common output A$_M$.

Figure 1A:
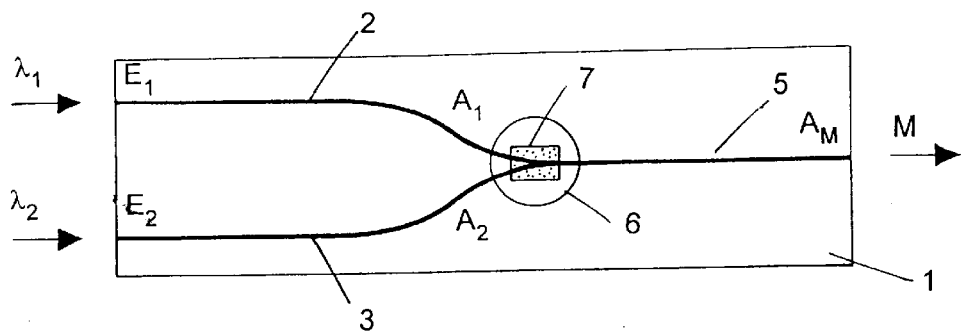
FIG. 1: Principle of wideband junction splitter devices
Figure 1B:
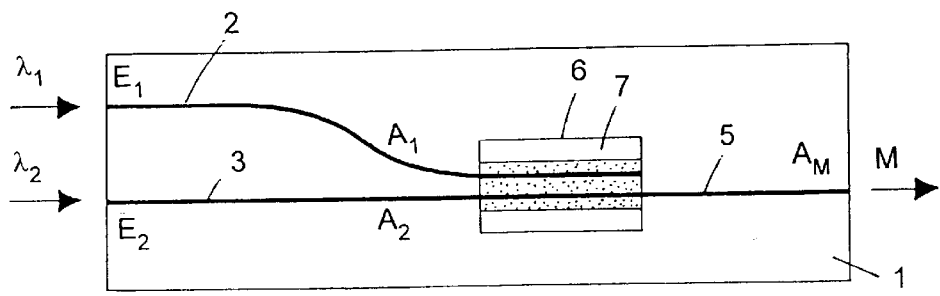
Figure 1C:
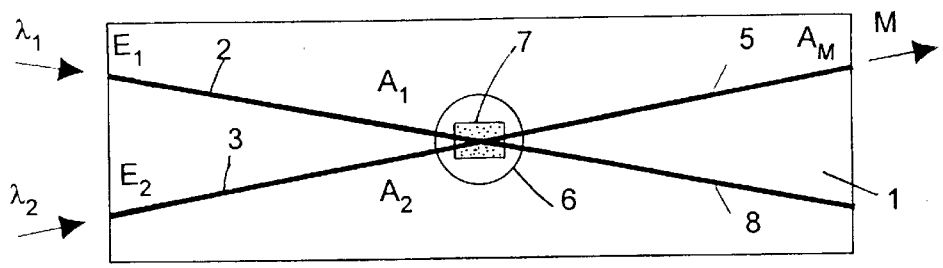
Figure 1D:
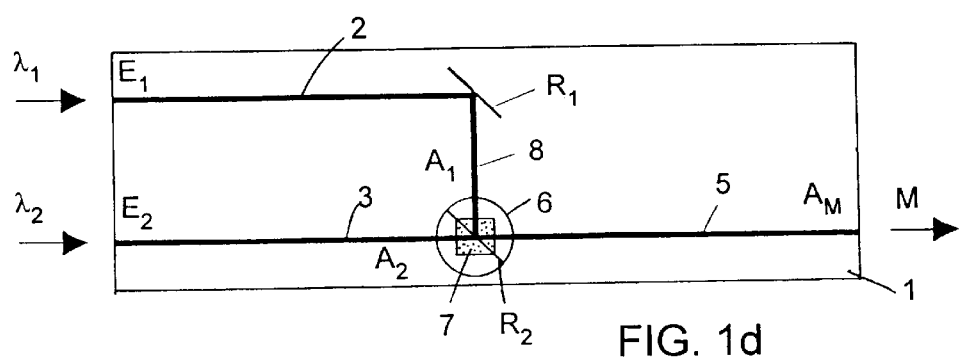
Figure 2:
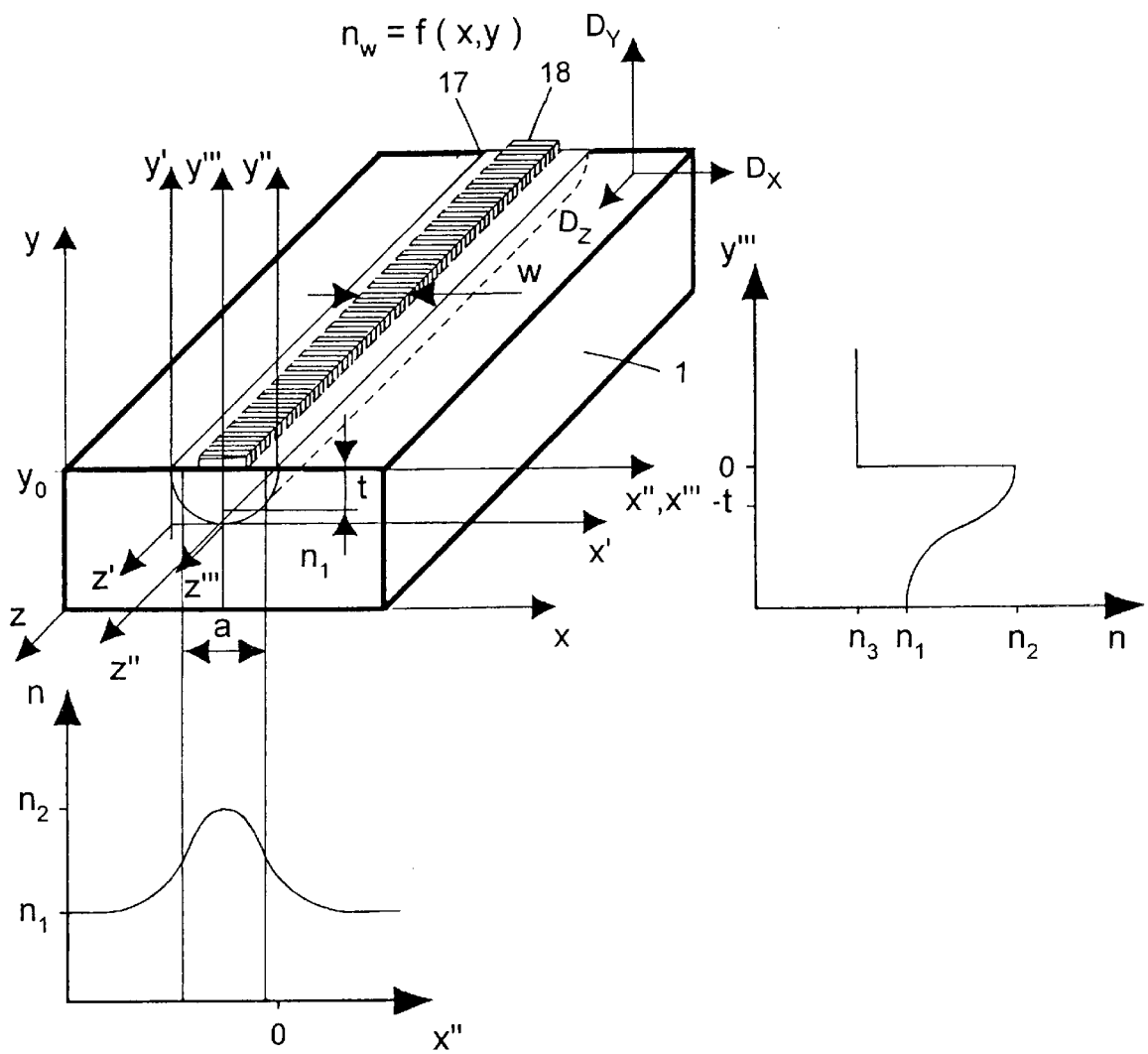
FIG. 2: Illustration of the structure and the course of the refractive index in a $Ti:LiNbO_3$ channel waveguide

According to FIG. 1a, the coupling point is of the Y-type. The Y-type is not mandatory. Other devices for two-mode interference may be implemented such as three-guide couplers according to FIG. 1b, X-couplers according to FIG. 1c, directional couplers or BOA. If required, the coupling point 6 may be actively influenced.

To this end, the coupling point 6 is designed as a controllable unit for beam combination and/or beam deviation. All channel waveguides (SOWCW) 2, 3, and 5 in this example are of the same type and will guide the light across a large wavelength range, which is greater than 130 nm approximately (value given applies to short-wave visible light) in single-mode, in order to enable efficient junction-splitting of light from a wavelength range greater than 95 nm approximately (see FIGS. 3, 5, and 6). The characteristic of the incoupling channel wave guides 2 and 3 to be SOWCW is not mandatory but always advantageous for any application. Light of wavelength $\lambda_1$ or wavelength range $\Delta\lambda_1$ will be applied at input E$_1$ to the first SOWCW 2, and light of wavelength $\lambda_2$ or wavelength range $\Delta\lambda_2$ will be applied at input E$_2$ to the second SOWCW 3. At the common output A$_M$ of the SOWCW 5, spatially combined light is available, which is designated as mixed signal M. The wideband junction splitter can also be operated in the opposite direction, that is, in splitting direction, in order to split a light signal into light components which, if required, may be controlled individually in the SOWCW 2 and 3. According to FIG. 1d, the SOWCW are combined by means of integrated-optical reflectors R. The SOWCW 2 will be deflected via a 90° reflector R$_1$ into the SOWCW 8. At the point where the SOWCW 3 and the SOWCW 8 meet, a second reflector R$_2$ is located, which will spatially combine the light components in the SOWCW 2 and 3 and/or 8 (coupling point 6) and pass them on in the SOWCW 5. If required, the reflectors R may be designed as controllable reflectors.

FIGS. 2 and 3 provide initial descriptions using the example of a standard titanium-indiffused channel waveguide in LiNbO$_3$.

FIG. 2 shows a standard channel waveguide 17 in a substrate material 1.

To fabricate the standard channel waveguide, a titanium-indiffusion will be carried out in X-cut lithium niobate (LiNbO$_3$) (X=crystallographic X-axis, corresponds to the y-axis in FIG. 2) (R. V. Schmidt, I. P. Kaminow, *Appl. Phys. Lett.*, Vol. 25 (1974), No. 8, pp. 458–460). To this end, a titanium strip 18 is sputtered onto the substrate surface.

At temperatures higher than 950° C., the titanium will diffuse into the LiNbO$_3$ crystal, by which the refractive index in the substrate material will be increased. In lateral direction, the diffusion constant is approximately twice as large as in depth direction, that is why the titanium combination distribution in the crystal widens very considerably. Following the diffusion time period $t_d$, and for an initial strip width w, the refractive index profile created obtains a shape described by the formulae below.

Titanium-indiffused channel waveguides in LiNbO$_3$ are not capable of guiding light with a bandwith of several 100 nm in singlemode. The waveguide 17 is provided as a groove, not to any great extent geometrically delimited, with the width a and the depth t.

The groove has a refractive index distribution $n_w = f(x,y)$, with a surface refractive index $n_2 = n_w(x''' = 0, y''' = 0)$, which is increased in relation to the refractive index $n_1$ of the surrounding substrate material. The diagrams in FIG. 2 show the qualitative course of the refractive index in x direction and in y direction. The steady transition of the refractive index course x direction (direction x'' is actually shown here) and in y direction (direction y''' is actually shown here) is typical.

FIG. 3 shows the wavelength range (bandwidth) of efficient junction-splitting by a Ti:LiNbO$_3$ junction splitter as well as the wavelength range (bandwidth) of light which is guided in single-mode in a titanium-indiffused channel waveguide in LiNbO$_3$, as an example, and without restricting the general validity of the calculation for a reference wavelength of 500 nm.

The graphs represent the effective refractive index for Z-polarized light ($N_{\textit{eff},Z}$, Z=crystallographic Z-axis, corresponds to x-axis in FIG. 2) of the fundamental mode $N_{00}$ and the first mode $N_{01}$ in lateral direction for width a of the channel waveguide itself and the second mode $N_{02}$ in lateral direction for the double width 2a of a channel waveguide, that is, corresponding to the increased width of the waveguiding area at the junction coupling point of a Y-splitter, BOA, or X-coupler. A w=3.0 μm wide, 15 nm thick sputtered titanium strip is used as a diffusion source, which widens in the junction coupling area to up to 2w (6.0 μm). The diffusion temperature is 1000° C., diffusion time will be 3 hours. The ratio of the titanium-ion diffusion constants in the LiNbO$_3$ is $$D_x/D_y \approx 2.$$

The depth profile is calculated as follows $$n_w = n_1 + (n_2 - n_1)^* \exp(-(y''')^2/a_y^2),$$

the lateral refractive index profile is calculated as follows $$n_w = n_1 + (n_2 - n_1)^* \ 0.5[\textit{erf}((2x'''+w)/2a_x) - \textit{erf}((2x'''-w)/2a_x)],$$

where $$a_x = 2(D_x t_d)^{1/2},$$

and corresponds to width a/2 in FIG. 2, furthermore $$a_y = 2(D_y t_d)^{1/2}$$

and corresponds to depth t in FIG. 2 and amounts to 2 μm. At λ=500 nm, $n_1$=2.2492; $n_2-n_1$=0.0080; the known wavelength dependence (dispersion) of the substrate index $n_1$ is less than zero. The wavelength dependence (dispersion) of ($n_2-n_1$) is known and also less than zero.

The value $t_d$ represents diffusion time, erf the error function (cf. J. Ctyroky, M Hofman, J. Janta, J. Schröfel, "*3-D Analysis of LiNbO$_3$: Ti Channel Waveguides and Directional Couplers*", IEEE J. of *Quantum Electron.*, Vol. QE-20 (1984), No. 4, pp. 400–409).

The channel waveguide described here guides in the wavelength range 490 nm to 620 nm—in a technically efficient sense—the fundamental mode $N_{00}$ only, i.e. the bandwidth of the channel waveguide will be $\Delta\lambda_w$=130 nm.

For efficient junction-splitting, it will be necessary to prevent the oscillation build-up of the second lateral mode $N_{02}$ in the entire widened junction or splitter area. For this reason, only the wavelength range between the oscillation build-up of fundamental mode $N_{00}$ of the channel waveguide of width a (corresponds to original channel width w) at λ=620 nm and the oscillation build-up of the second lateral mode $N_{02}$ in the junction splitter component widened to 2a (corresponds to original channel width 2w) at λ=525 nm may be used. Thus the efficiently usable bandwidth $\Delta\lambda_N$ of the junction splitter reduces by 35 nm to the value $\Delta\lambda_v$=95 nm.

The effective refractive indices were calculated using the effective index method (G. B. Hocker, W. K. Burns "*Mode dispersion in diffused channel waveguides by the effective index method*", Appl. *Optics*, Vol 16 (1977), No. 1, pp. 113–118).

Figure 4:
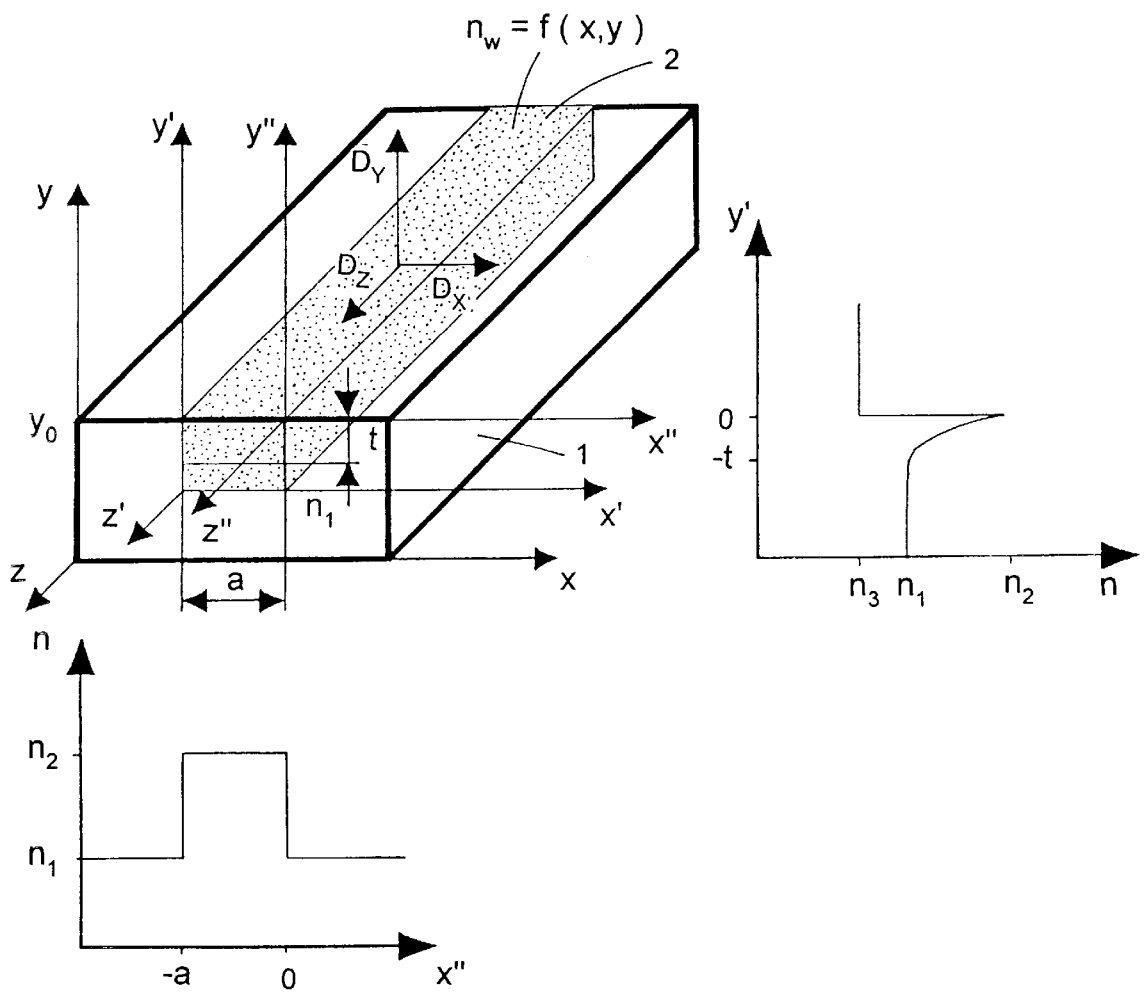
FIG. 4: Illustration of the structure and the course of the refractive index in a Rb:KTP-SOWCW

FIG. 4 shows the single-mode integrated-optical wideband channel waveguide (SOWCW) 2, according to this invention, in substrate material 1: in this example, Z-cut potassium titanyl phosphate (KTiOPO$_4$, KTP). (Z=crystallographic Z-axis, corresponds to the y-axis in FIG. 4). (M. Rottschalk, J.-P. Ruske, K. Hornig, A. Rasch, "*Fabrication and Characterization of Singlemode Channel Waveguides and Modulators in KTiOPO$_4$ for the Short Visible Wavelength Region*", SPIE 2213, *International Symposium on Integrated Optics* (1994) pp. 152–163).

The substrate material 1 will be provided with a mask leaving a gap open at the future channel waveguide location only. The ion exchange will be effected in a melt of rubidium nitrate complete with barium nitrate and potassium nitrate components. A diffusion is predominantly effected in depth direction only, with the refractive index profile forming which is described below. In a lateral direction, there follows a step profile of the refractive index. The fabrication of narrow structures, sharply delimited laterally, is ensured as the transmission from the mask into the waveguide occurs at the ratio of 1:1 due to almost complete lack of a side diffusion.

The SOWCW 2 is provided as a groove, sharply delimited geometrically, with the width a and the depth t. The groove has a refractive index distribution $n_w$=f(x,y), with a surface refractive index $n_2=n_w$ (−a≦x''≦0, y''=0), which is increased in relation to the refractive index $n_1$ of the surrounding substrate material.

The diagrams in FIG. 4 show the qualitative course of the refractive index in x-direction and in y-direction. The steep jump of the refractive index course in x-direction (direction x'' is actually shown here), and the comparatively high increase of the refractive index from $n_1$ to $n_2$ in y-direction (direction y' is actually shown here), are typical.

FIG. 5 shows the wavelength range (bandwidth) of efficient junction-splitting by a Rb:KTP junction splitter as well as the wavelength range (bandwidth) of light which is guided singlemode in a rubidium⇌potassium ion-exchanged channel waveguide in KTP, as an example, and without restricting the general validity of the calculation for a reference wavelength of 500 nm.

The graphs represent the effective refractive index for Z-polarized light ($N_{\textit{eff}, Z}$, Z=crystallographic Z-axis, corresponds to y-axis in FIG. 4) of the fundamental mode $N_{00}$ and the first mode $N_{01}$ in lateral direction for width a of the channel waveguide itself and the second mode $N_{02}$ in lateral direction for the double width (2a) of a channel waveguide, that is, corresponding to the increased width of the waveguiding area at the junction coupling point of a Y-splitter, X-coupler, or BOA. At λ=500 nm, $n_1$=1.9010; the known wavelength dependence (dispersion) of the substrate index $n_1$ is less than zero (described in: L. P. Shi, *Application of crystals of the KTiOPO$_4$—type in the field of integrated optics*, Dissertation Univ. Cologne (1992)) .

Furthermore, $n_2-n_1$=0.0037=const. applies to the entire wavelength range.

For the diffusion constants, the following holds $$D_x/D_y \approx 10^{-3}.$$

The lateral refractive index profile is thus a step profile (cf. FIG. 4) with the width a=4.0 μm, or 2a (8.0 μm) for the maximum width in the junction area.

The depth profile is calculated as follows $$n_w = n_1 + (n_2 - n_1)*erfc(-y''/t)$$

where t=4.0 μm, erfc=complementary error function. The SOWCW described in this example guides—in a technically efficient sense, and within the range 470 nm to 870 nm,—the fundamental mode $N_{00}$ only, that is, the bandwidth of the channel waveguide is $\Delta\lambda_w$=400 nm.

For efficient junction-splitting, it will be necessary to prevent the oscillation build-up of the second lateral mode $N_{02}$ in the widened junction or splitter area. For this reason, only the wavelength range between the oscillation build-up of fundamental mode $N_{00}$ of the channel waveguide of width a at λ=870 nm and the oscillation build-up of the second lateral mode $N_{02}$ in the junction splitter component widened to 2a at λ=485 nm may be used. Thus the efficiently usable bandwidth $\Delta\lambda_N$ of the junction splitter according to the invention reduces slightly by 15 nm to the value $\Delta\lambda_v$=385 nm.

The effective refractive indices were calculated using the effective index method.

FIG. 6a shows a general illustration of the technically relevant usable wavelength range for single-mode waveguiding in a channel waveguide, and for efficient junction-splitting in a junction splitter. In connection with this Figure, technically relevant signifies that the effective refractive index $N_{eff}$ must be at least $5\times10^{-5}$ above $n_s$ where $n_s$ designates the value of substrate index $n_1$ or superstrate index $n_3$, whichever is the greater, to ensure a sufficiently low waveguide attenuation, e.g. 1 dB/cm.

To each given wavelength in the range $\Delta\lambda_w$, one and only one effective refractive index, i.e. the effective refractive index of fundamental mode $N_{00}$ will be allocated.

The single-mode range of the channel waveguide will be determined by the efficient oscillation build-up, from a technical point of view, of fundamental mode $N_{00}$ at wavelength $\lambda_a + \Delta\lambda_w$ on the one hand, and by the efficient oscillation build-up, from a technical point of view, of the first mode in lateral direction $N_{01}$ or of the first mode in depth direction $N_{10}$ at wavelength $\lambda_a$ on the other hand. For efficient junction-splitting, it is necessary to prevent the oscillation build-up of the second lateral mode $N_{02}$ in the widened junction- or splitter area, that is the coupling area with increased, e.g. doubled, waveguide width.

This leads to a further criterion which restricts the usable bandwidth of the junction splitter when compared against the bandwidth of the channel waveguide, namely the spectrum width $\Delta\lambda_v$, that is the wavelength range between the oscillation build-up of the fundamental mode $N_{00}$ of the channel waveguide with a single width, at $\lambda_a + \Delta\lambda_w$, and the oscillation build-up of the second lateral mode $N_{02}$ in the widened coupling area, e.g. doubled width, at wavelength $\lambda_b$. For this reason, the usable bandwidth $\Delta\lambda_N$ for efficient junction-splitting is the lesser of the two values $\Delta\lambda_w$ or $\Delta\lambda_v$.

FIG. 6b shows the single-mode transmissible wavelength ranges of the channel waveguide according to the current state of the art (consisting of titanium-indiffused $LiNbO_3$, Ti:$LiNbO_3$) and the SOWCW according to this invention (consisting of rubidium⇌potassium ion-exchanged $KTiOPO_4$, Rb:KTP) as well as the wavelength ranges for efficient junction-splitting of the junction splitter according to the state of the art and the wideband junction splitter according to the invention, respectively as a function of wavelength λ.

From the minimum of three channel waveguides forming the wideband junction splitter, at least that channel waveguide which, according to the application is to transmit a wide wavelength spectrum, must be a SOWCW.

The calculation of the effective refractive indices, upon which the determination of the single-mode transmissible wavelength ranges is based, was done by means of the effective index method.

Based on the known wavelength dependence (dispersion) of the refractive index increase required for wave guidance, as well as on the wavelength dependence (dispersion) of the substrate index, and starting from the concrete reference wavelength $\lambda_a$, first the waveguide depth, then the waveguide width (until respective oscillation build-up of the first mode) and finally the wavelength (until fundamental mode had disappeared), were varied in this calculation.

The upper limit of the single-mode transmissible wavelength range $\Delta\lambda_w$ will be the wavelength $\lambda_a + \Delta\lambda_w$ where the effective refractive index $N_{00}$ of the fundamental mode for the channel waveguide is $5\times10^{-5}$ above the substrate index.

In FIG. 6b, the single-mode transmissible wavelength range of a SOWCW according to the invention is situated above the straight line with the equation $$\Delta\lambda_w = 0.48 \times \lambda - 85 \text{ nm}$$

(where λ and $\Delta\lambda_w$ are to be stated in nm).

For efficient junction-splitting, it is necessary to prevent the oscillation build-up of the second lateral mode $N_{02}$ in the entire widened junction- or splitter area. For this reason, only the wavelength range between the oscillation build-up of fundamental mode $N_{00}$ of the channel waveguide of width a at wavelength $\lambda_a + \Delta\lambda_w$ and the oscillation build-up of the second lateral mode $N_{02}$ in the junction splitter component widened to 2a at wavelength $\lambda_b$ may be used.

In addition to the graphs representing the bandwidths of channel waveguides $\Delta\lambda_w$, the graphs describing the bandwidths of junction splitters $\Delta\lambda_v$ are also shown. From the state of the art, it can be deduced that the size of the area for efficient junction-splitting $\Delta\lambda_v$ must meet the inequality $$\Delta\lambda_v > 0.27 \times \lambda - 34 \text{ nm}$$

(where λ and $\Delta\lambda_v$ are stated in nm), in order to characterize a wideband junction splitter. The region corresponding to a wideband junction splitter has been marked in grey in FIG. 6b. In principle, the area for efficient junction-splitting is restricted by the lower limit ($\lambda_{min}$) as well as the upper limit ($\lambda_{max}$) of the optical transmission area of the waveguide material (see FIG. 6a).

Using other suitable waveguide materials, these two inequations can also be applied to wavelengths less or greater than for $\lambda_{min}$ or $\lambda_{max}$ of the substrate material $KTiOPO_4$ (KTP), here calculated and described by way of example.

The FIGS. 7 to 10 show first implementation examples of wideband junction splitters.

Figure 7:
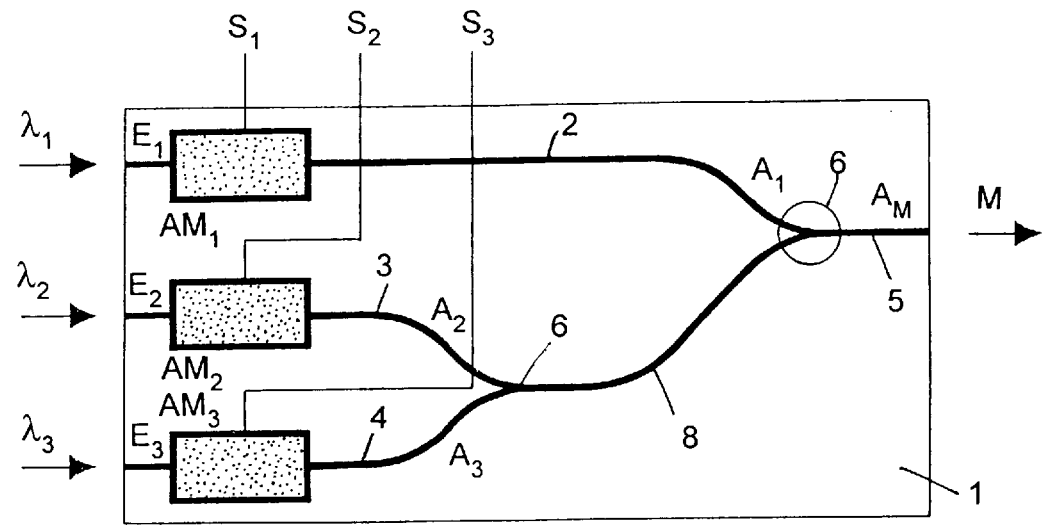
FIG. 7: Wideband junction splitter complete with modulation devices

In the example shown in FIG. 7, light from three light sources of differing wavelengths $\lambda_1$, $\lambda_2$, and $\lambda_3$, is injected into respectively one each of the three SOWCW 2, 3, and 4, combined at the coupling points 6, and spatially combined in SOWCW 8 or SOWCW 5, passed on, and made available at output $A_M$ of the SOWCW 5 as mixed signal M.

To control the amplitude or intensity of the light components in the individual SOWCW, the light from each light source may be selectively modulated. In this example, this is effected by means of the signals $S_1$, $S_2$, and $S_3$, which are applied to controllable amplitude or intensity modulators $AM_1$, $AM_2$, and $AM_3$. The controllable amplitude modulators or intensity modulators $AM_1$, $AM_2$, and $AM_3$ are located in the various individual SOWCW 2, 3, and 4. Depending on the control signals, the modulated intensities of the various wavelengths will result in a mixed signal M comprised of the spatially superimposed light components whose respective intensities can be adjusted by means of the amplitude modulators for the individual wavelengths. In the wavelength range for visible light, the mixed signal M can be perceived as a subjective colour impression.

Due to the possibility of electro-optical modulation into the GHz range (current state of the art), the device can be utilized for generating fast changing light intensities, and, by means of the spatial combination of light, for fast changing physiological mixing of colours in the human eye.

Figure 8:
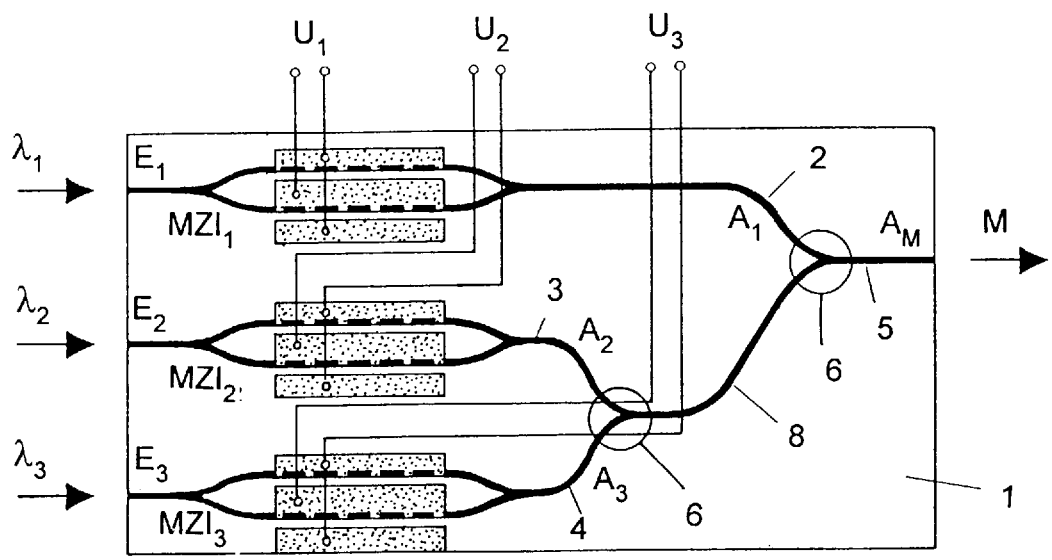
FIG. 8: Wideband junction splitter complete with Mach-Zehnder interferometer modulators

FIG. 8 shows an implementation of a wideband junction splitter in a $KTiOPO_4$ (KTP) substrate 1 with amplitude modulators or intensity modulators, designed as Mach-Zehnder interferometer modulators $MZI_1$, $MZI_2$, and $MZI_3$.

By applying the control voltages $U_1$, $U_2$, and $U_3$ to the electrodes, the propagation constant of the light in the two branches of a Mach-Zehnder interferometer will be changed to different values via the linear electro-optical effect in the electro-optically active material. In place of the combination in the interferometer, there will either be a constructive or destructive interference, depending on the phasing of the light components. These control voltages thus govern the amplitude of the light components in the SOWCW 2, 3, and 4 (see also FIG. 18).

Figure 9:
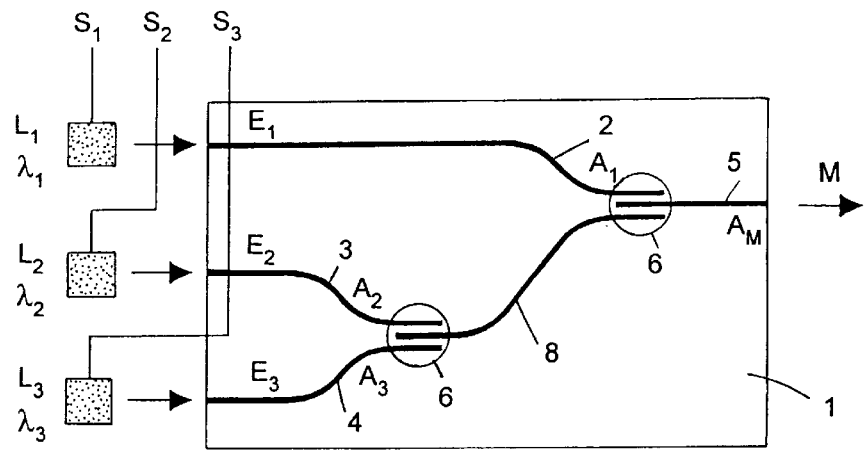
FIG. 9: Wideband junction splitter comprised of three-guide couplers with controllable light sources

According to FIG. 9, there is a further option for amplitude or intensity modulation consisting of the modulation of the light sources $L_1$, $L_2$, and $L_3$, which is effected by means of the control signals $S_1$, $S_2$, and $S_3$, e.g. via the diode current for laser diodes.

Further amplitude modulators will then not be mandatory on the SOWCW. The wideband junction splitter features coupling points 6 which are here designed as three-guide couplers.

FIG. 10 illustrates wideband junction splitters whose coupling points 6 or 6' effect more than a two-times split or more than a two-times combination. The solutions described in the above Figures may also be applied to wideband junction splitters the coupling points of which feature more than 2 inputs or outputs. In splitting direction, the light will not necessarily split into equal light components.

Figure 10A:
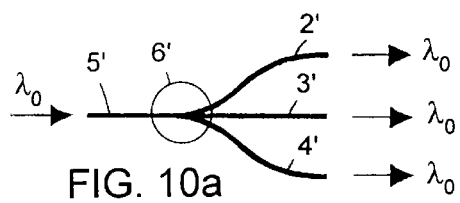
FIG. 10: Wideband junction splitter: design types
Figure 10B:
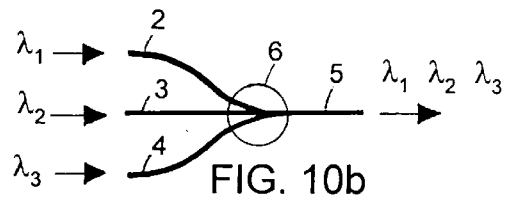

FIG. 10a and FIG 10b show a wideband junction splitter in which the input SOWCW will be split, at coupling point 6', in the form of a Y-junction splitter into three SOWCW 2', 3', and 4', or in which three SOWCW 2, 3, 4 will be combined, at coupling point 6, in the form of a Y-junction combiner.

Figure 10C:
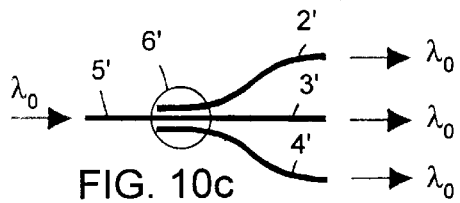
Figure 10D:
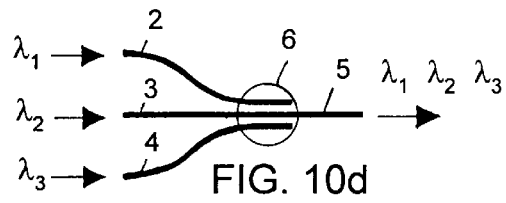

FIG. 10c and FIG. 10d show a triple wideband junction splitter, whose coupling point is made up of three-guide couplers, in splitting or combining operation.

Figure 10E:
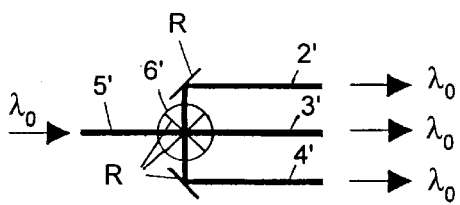
Figure 10F:
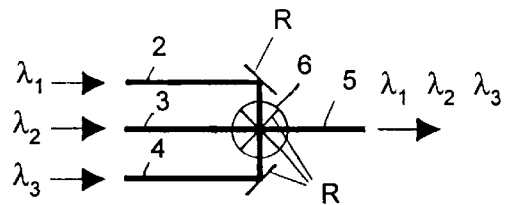

FIG 10e and FIG 10f show a triple wideband junction splitter, whose coupling point is made up of integrated-optical reflectors, in splitting or combining operation.

Figure 10G:
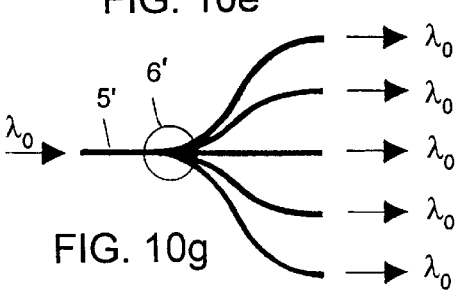
Figure 10H:
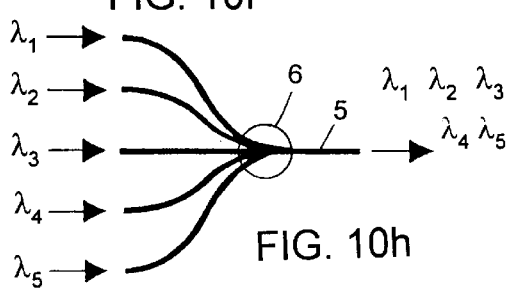
Figure 11:
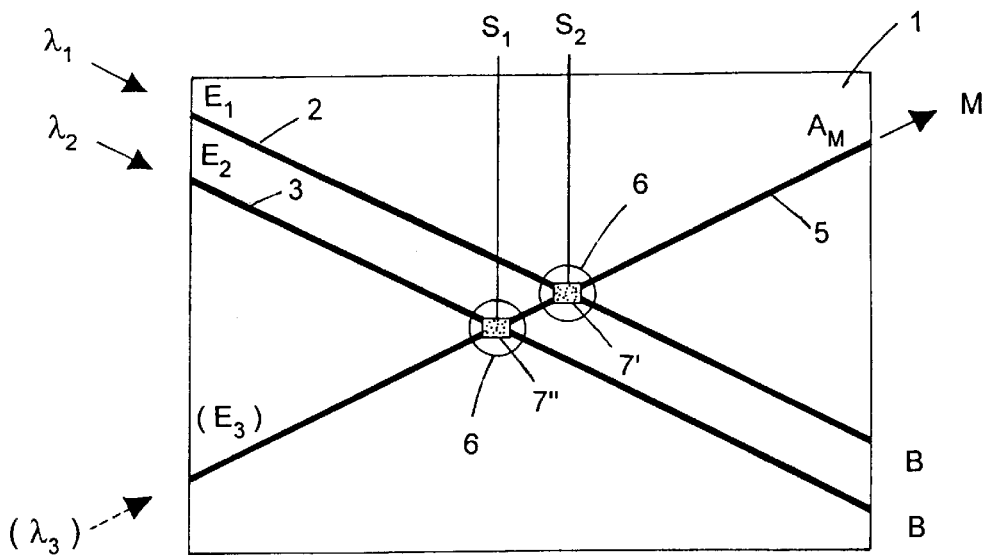
FIG. 11: Wideband junction splitter complete with controllable units for beam combination and/or beam deviation as a 2×1 matrix
Figure 12:
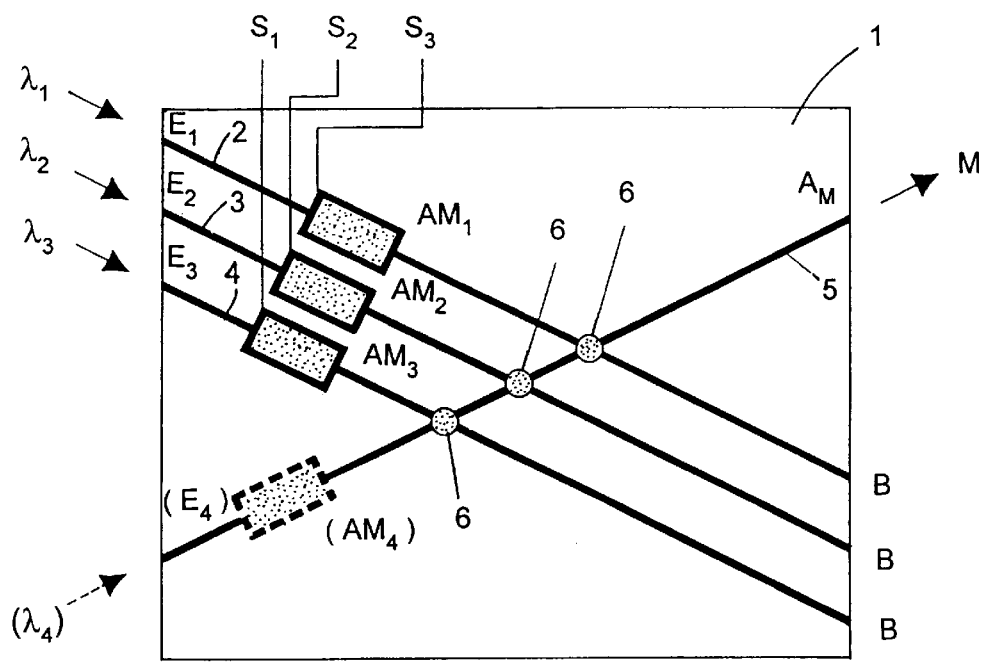
FIG. 12: Wideband junction splitter complete with passive units for beam combination and/or beam deviation, and modulators, as a 3×1 matrix
Figures 13A, 13B:
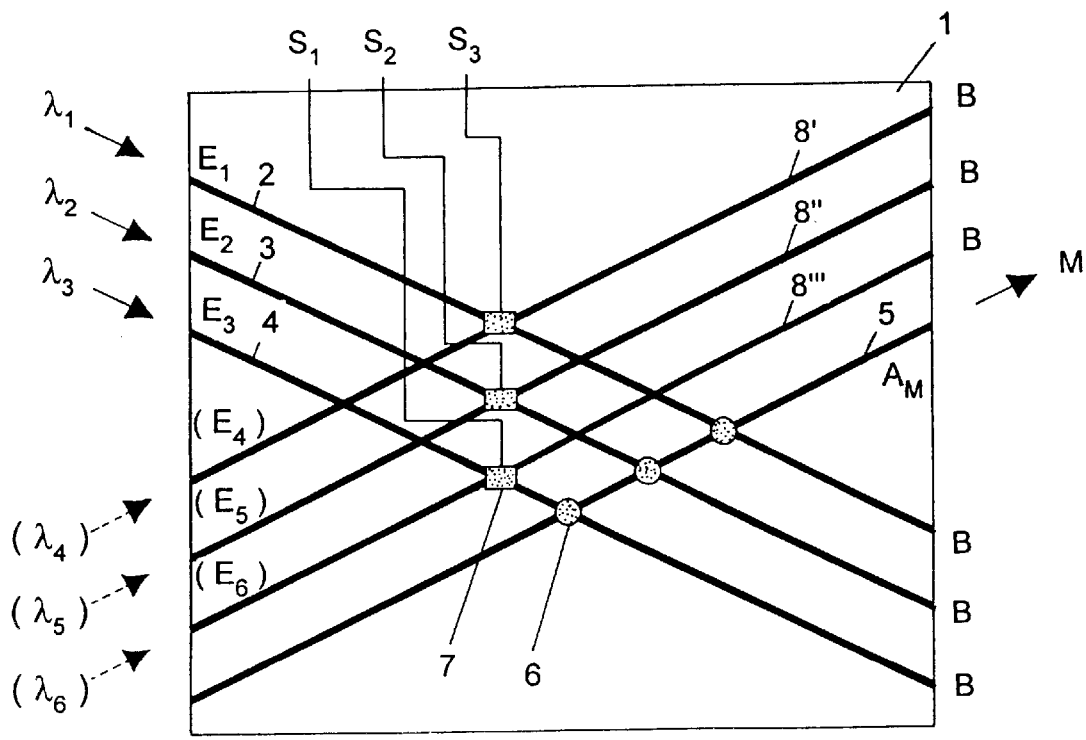
FIG. 13: Wideband junction splitter complete with controllable units for beam combination and/or beam deviation as a m×n matrix

In principle, it is possible to combine or split any number of waveguides at a coupling point 6 (FIG. 10g and FIG. 10h). However, limits are set by the technological mastery of the manufacturing processes and the engineering design of the coupling point. In splitting operation of the wideband junction splitter, the light of wavelength $\lambda_0$ or wavelength range $\Delta\lambda$ will be divided up into each SOWCW. In each SOWCW, there is coherent light, provided that the injected light is coherent. In junction operation, the light components of the same or differing wavelength are spatially combined. The light components do not interfere with each other. FIGS. 11 to 13 show further integrated-optical implementation variants of the wideband junction splitter, in which the coupling points 6 are generated by waveguide intersections.

The intersection points act, depending on the requirement, as completely passive intersection points, or they are coupling points 6 for the spatial combination of light components, or they are designed as controllable units for the spatial combination of beams and/or deviation of beams 7, that is as elements capable of switching, modulating, or deviating, and spatially combining light. The controllable units for the spatial combination of beams and/or deflection of beams 7 operate on the basis of the two-mode interference as X-couplers, directional couplers, or BOA.

FIG. 11 shows the intersection of two SOWCW 2 and 3 with a further SOWCW 5 as a 2×1 matrix. The intersections (coupling points 6) are formed as the controllable units for spatial beam combination and/or beam deviation 7' and 7". Light of two wavelengths $\lambda_1$ and $\lambda_2$ is injected into one each of the SOWCW 2 and 3. The active coupling points act as selective light gates, which allow the light in the common SOWCW 5 to pass in the direction of the mixed signal M completely uninfluenced, but deflect the light components of the wavelengths $\lambda_1$ and $\lambda_2$ in the SOWCW 2 and 3 as a function of the applied control signals $S_1$ and $S_2$ with differing electro-optical intensity in the direction of the SOWCW 5, with the light components in the SOWCW 5 being spatially combined and available as mixed signal M at output $A_M$. The guided light components that are not completely deviated are passed forward in the SOWCW 2 and 3 to the blind outputs B.

Each controllable unit for beam combination and/or beam deviation 7' and 7" is dimensioned such that it acts for the selected wavelength $\lambda_1$ or $\lambda_2$ respectively, as a modulator, and simultaneously deflects the light component, and spatially combining this component with the other light component. The respective other wavelength is not, or only slightly, influenced by the modulator.

In respect of a remaining mutual interaction of the controllable units for spatial beam combination and/or beam deviation 7' and 7", the degree of this mutual interaction is compensated by an active control of the control signals and/or light sources.

This device can be advantageously operated in time-miltiplexed fashion so that the problems with decoupling of the controllable units for spatial beam combination and/or beam deviation 7' and 7" do not occur. Due to the possible very high control frequency, this can be implemented easily.

Furthermore, a third light component of the wavelength $\lambda_3$ may be injected into an input $E_3$ of the SOWCW 5. This light component may be spatially combined with the light components injected into the SOWCW 2 and 3.

FIG. 12 shows a further integrated-optical implementation variant of the wideband junction splitter as a 3×1 matrix. The SOWCW 2, 3, and 4 intersect a further SOWCW 5. The intersections are passive coupling points 6, which spatially combine light components in the SOWCW 5. The modulators $AM_1$, $AM_2$, and $AM_3$ are located on each of the SOWCW 2, 3, and 4 in order to modulate the light components. Light from three wavelengths $\lambda_1$, $\lambda_2$, and $\lambda_3$ is respectively injected into one each of the SOWCW 2, 3, and 4. The coupling points 6 act as light beam combiners and light beam deflectors. The spatially combined light is fed out from the SOWCW 5 as a mixed signal M. At the SOWCW 2, 3, and 4, electro-optical modulators $AM_1$, $AM_2$, and $AM_3$ are located which allow the light components of wavelengths $\lambda_1$, $\lambda_2$, and $\lambda_3$ to pass with differing intensities, as a function of the applied control signals $S_1$, $S_2$, and $S_3$.

Furthermore, here also a light component of wavelength $\lambda_4$ may be injected into an input $E_4$ of the SOWCW 5. This light component may be spatially combined with the light components guided in the SOWCW 2, 3, and 4.

Alternatively, for the case of three light components being utilized, one of the SOWCW 2, 3, or 4, complete with its associated modulators and coupling points may be omitted.

FIG. 13 shows a further integrated-optical implementation valiant of the wideband junction splitter as a 3×4 matrix. The intersections are either points which transmit light into the SOWCW in completely uninfluenced fashion (passive intersecting point), or passive coupling points 6 or controllable units for the spatial combination of beams and/or deviation of beams 7.

The light from three wavelengths $\lambda_1$, $\lambda_2$, and $\lambda_3$, is respectively injected into one each of the SOWCW 2, 3, and 4. The SOWCW 2, 3, and 4 intersect the four SOWCW 8', 8", 8''', and 5.

To elucidate their function, the intersecting points are shown in the form of a matrix. At the intersecting points determined by the column-lines 1—1, 2—2, and 3—3, actively controllable units for the spatial combination of beams and/or deviation of beams 7 are located. These units serve to modulate the three light components.

In the column-lines 1–4, 2–4, and 3–4, passive coupling points 6 are located, which spatially combine and/or deflect the light components. The coupling points 6 will not be controlled here. They are used for spatially combining the light components into the mixed signal M in the common SOWCW 5. Any light components which are not required will be guided to the blind outputs B of the SOWCW 2,3, 4, 8', 8", and 8'''.

Furthermore, here also additional light components may be injected into the inputs $E_4$, $E_5$, and $E_6$ of the SOWCW 8', 8", and 8''', and are controllable. These light components may be spatially combined with the light components guided in the SOWCW 2, 3, and 4.

Figure 14:
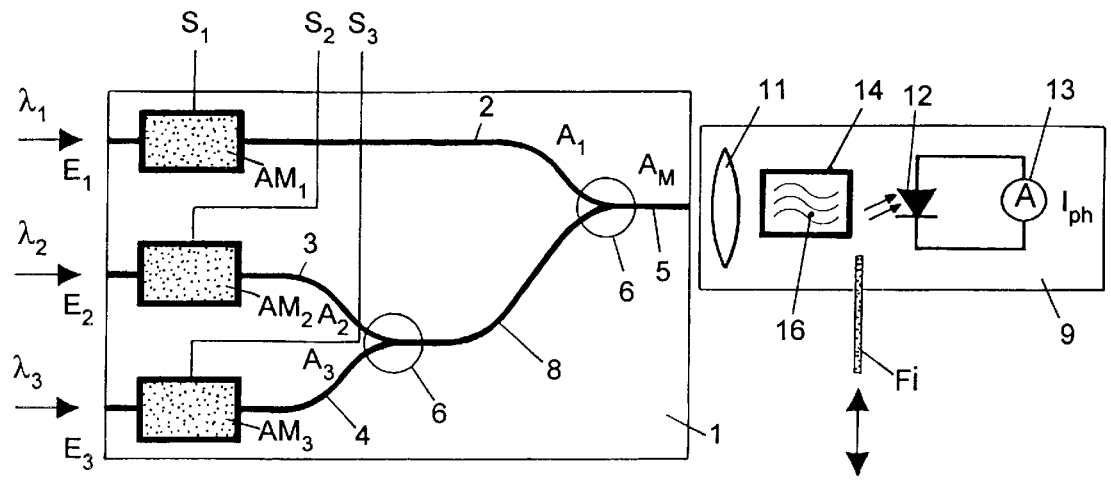
FIG. 14: Photometer device with separate interaction cell
Figure 15:
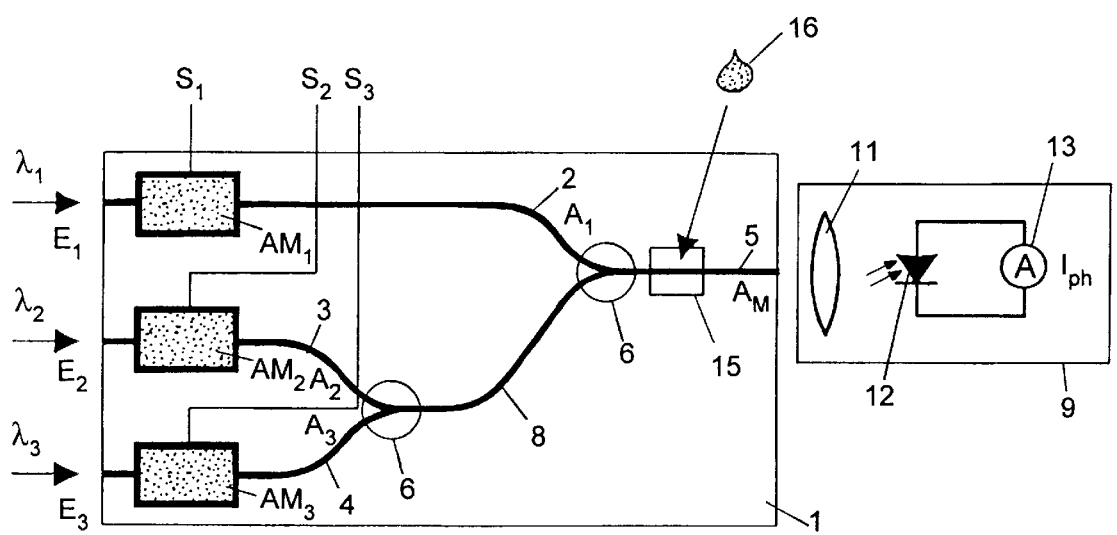
FIG. 15: Photometer device with interaction window

The FIGS. 14 and 15 show devices for determining the concentration of a given substance by photometric measurement. The integrated-optical implementation of the measurement setup, by means of wideband junction splitters, enables miniaturization of the sample quantity and a simultaneous increase in the bandwidth usable for the measurement, as compared to standard solutions.

In FIG. 14, the absorption of a medium to be measured 16 (liquids or gases) contained in a separate interaction cell 14 is determined by a photodetector 12. These transmission measurements can also be carried out on a solid substance (not shown here). In addition, reflection measurements can be carried out (not shown here).

Light of three different wavelengths is respectively injected into one each of the SOWCW 2, 3, and 4, spatially combined, and then radiated through an interaction cell 14 located between output $A_M$ of the common SOWCW 5 and the photodetector 12, in which interaction cell 14 there is a liquid 16 to be measured. Advantageously, there is a feed-out device 11 between the interaction cell 14 and the waveguide output $A_M$ for feeding out light and beam shaping. The measurement can be carried out according to one of the procedures described below:

a) There is a time-multiplexed feed-out of the individual light components at waveguide output $A_M$. The absorption is measured directly (i.e. without filter) for the respective wavelength.

By means of the modulators $AM_1$, $AM_2$, and $AM_3$ in each SOWCW 2, 3, and 4, light components may be switched by control signals $S_1$, $S_2$, and $S_3$, or a switching of the light sources themselves is effected.

For a fluorescence measurement, filters Fi are advantageously located between the interaction cell 14 and the photodetector 12 in order to separate excitation light and measurement light.

b) There is a simultaneous injection of all light components into the respective inputs of the SOWCW and a simultaneous feed-out of the light components at the output of SOWCW $A_M$. The measurement wavelength is selected by swivelling a filter Fi between interaction cell 14 and photodetector 12 (without modulators). An amplitude modulation of the light components is as such advantageous for all measurements, as higher degrees of measurement accuracy may usually be achieved by means of dynamic measurement procedures.

The number of wavelengths used is not restricted to three; this number may be two or more, depending on the relevant purpose.

According to FIG. 15 the absorbing effect of media to be measured 16 (gaseous, liquid, solid) on the evanescent field (located in the superstrate) of the guided wave is measured and evaluated.

To this end, the covered common SOWCW 5 will be provided with a defined interaction window 15, onto which the medium to be measured 16 is applied.

The light components of the wavelengths $\lambda_1$, $\lambda_2$, $\lambda_3$ are modulated by means of the amplitude modulators $AM_1$, $AM_2$, and $AM_3$.

By absorption of the medium to be measured itself or by a change in the surface scattering, a change in waveguide attenuation is caused, which is expressed as a change in the photo current $I_{ph}$. This variant utilizes the fact that, with light of a mode guided in the channel waveguide, a part of the electric or magnetic field will be guided outside the SOWCW itself (evanescent field). These field components may thus be accessed and influenced from outside the SOWCW. If an absorbing medium is on the SOWCW, then the evanescent field itself—depending on absorption—will be attenuated, or the surface scattering of the SOWCW will be changed by applying a medium which need not necessarily be absorbing. Both will cause the waveguide attenuation to change, and this can be measured by means of the photodetector 12.

The surface of the substrate which comes into contact with the medium to be measured, will be covered by a buffer layer (e.g. $SiO_2$) excepting only the interaction window 15. In this way, the evanescent field will be accessible only in the interaction window area. Also, a precisely defined measurement length will be defined in this way (as the total absorption depends on the length of the interaction window).

Using this measurement setup, it is possible to measure e.g. the absorption, refractive index, or scattering, and thus determine the influence of those physical, biological, and chemical quantities (to be measured) of gases, liquids, and solids, which cause a change in the behavior of the guided light or the channel waveguide as such.

A further implementation variant is that the interaction window 15 is coated with a substance reacting to physical, chemical, or biological external influences, which substance, when acted upon by such external influences, will influence the behaviour of the guided light or the SOWCW as such.

The integrated-optical implementation of the measurement setup favors a miniaturized structure. The smallest sample quantities can be used, as the interaction window must only be just a fraction wider than the waveguide, and the length of the interaction window can be within the millimeter range.

Figure 16:
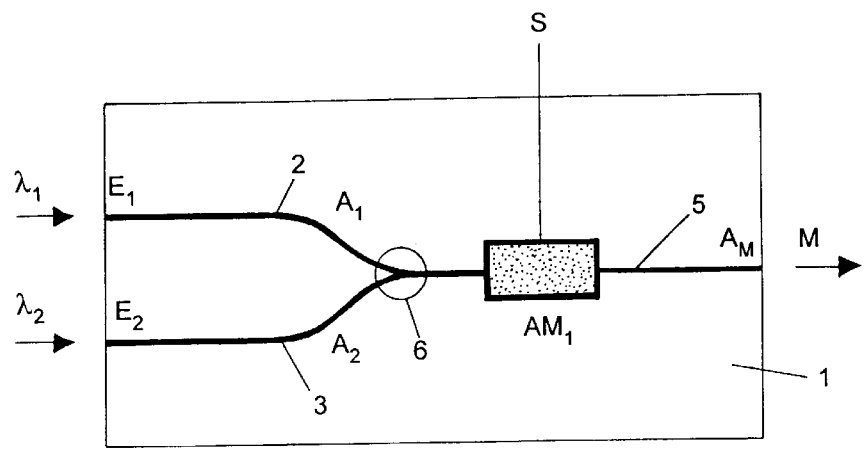
FIGS. 16 and 16a–16c: Wideband junction splitter for time multiplex operation
Figure 16A:
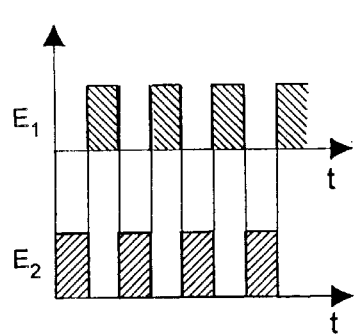

FIG. 16 shows a wideband junction splitter which is operated in time-multiplexed fashion. At the inputs $E_1$ and $E_2$, signals of constant amplitude are alternately applied and will be amplitude-modulated following the spatial combination of the light components as a function of the signal S applied to the amplitude modulator $AM_1$. FIG. 16a shows the amplitude curve of the applied time-multiplexed signal S of wavelengths $\lambda_1$ and $\lambda_2$.

Figure 16B:
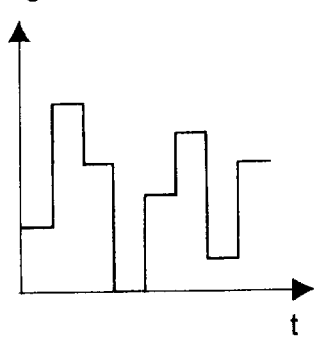

FIG. 16b shows the curve of the signal S for modulating the light components.

Figure 16C:
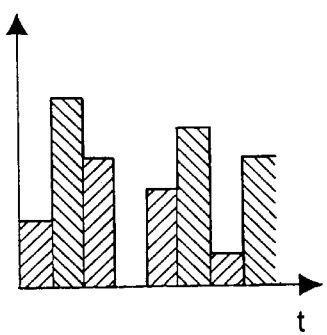

FIG. 16c shows the curve of the combined light components (mixed signal M) available at output $A_M$.

FIG. 17 shows a wideband junction splitter according to this invention, with at least one SOWCW 2 and/or 3 being provided with an electrode structure 10 for phase modulation.

The electrodes 10 have an effective electrode length L ranging from some millimeters to some centimeters, as well as an electrode gap d of some μm.

The requirement for a light modulation capability is met by the use of a substrate material which allows a possibility for influencing the phase of an optical mode guided in a channel waveguide.

In the example, $KTiOPO_4$ (KTP) is used as a substrate material. The input signal is a discrete wavelength λ or a wavelength range Δλ.

Figure 17A:
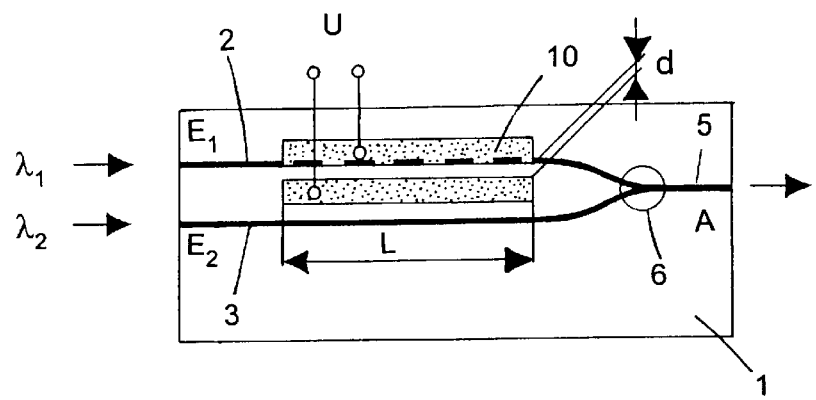
FIG. 17: Wideband junction splitter complete with phase modulators in the input branches

FIG. 17a shows a wideband junction splitter whose SOWCW 2 is provided with electrodes 10 for phase modulation.

When the same wavelength $\lambda_1$ is applied to inputs $E_1$ and $E_2$, and if coherent light is used, there will be either constructive or destructive interference at coupling point 6, depending on the actual phasing. Here, the effective electrode length in the individual waveguide 2 is L.

Figure 17B:
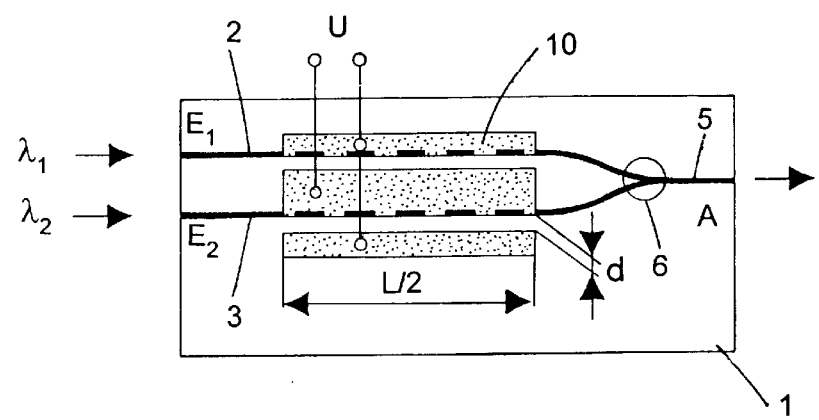

FIG. 17b shows a wideband junction splitter whose two SOWCW 2 and 3 are respectively provided with electrodes 10 for phase modulation operating by push-pull. When the same wavelength $\lambda_1$ is applied to inputs $E_1$ and $E_2$, and if coherent light is used, there will be either constructive or destructive interference at coupling point 6, depending on the actual phasing. Here, the effective electrode length in each individual waveguide 2 or 3 is L/2. If $\lambda_1$ is applied to the inputs $E_1$ and $E_2$, the entire effective electrode length is L, as the electrodes in the example are of length L/2, but operate in push-pull fashion, thus causing the lengths to be added up. Phasing may be controlled by the modulation voltage U. Using SOWCW ensures functional operation across a wide wavelength band.

FIG. 17 shows a wideband junction splitter according to this invention, with at least one SOWCW 2 and/or 3 being provided with an electrode structure 10 for phase modulation.

The electrodes 10 have an effective electrode length L ranging from some millimeters to some centimeters, as well as an electrode gap d of some μm.

The requirement for a light modulation capability is met by the use of a substrate material which allows a possibility for influencing the phase of an optical mode guided in a channel waveguide.

In the example, $KTiOPO_4$ (KTP) is used as a substrate material. The input signal is a discrete wavelength λ or a wavelength range Δλ.

FIG. 17a shows a wideband junction splitter whose SOWCW 2 is provided with electrodes 10 for phase modulation.

When the same wavelength $\lambda_1$ is applied to inputs $E_1$ and $E_2$, and if coherent light is used, there will be either constructive or destructive interference at coupling point 6, depending on the actual phasing. Here, the effective electrode length in the individual waveguide 2 is L.

FIG. 17b shows a wideband junction splitter whose two SOWCW 2 and 3 are respectively provided with electrodes 10 for phase modulation operating by push-pull. When the same wavelength $\lambda_1$ is applied to inputs $E_1$ and $E_2$, and if coherent light is used, there will be either constructive or destructive interference at coupling point 6, depending on the actual phasing. Here, the effective electrode length in each individual waveguide 2 or 3 is L/2. If $\lambda_1$ is applied to the inputs $E_1$ and $E_2$, the entire effective electrode length is L, as the electrodes in the example are of length L/2, but operate in push-pull fashion, thus causing the lengths to be added up. Phasing may be controlled by the modulation voltage U. Using SOWCW ensures functional operation across a wide wavelength band.

Figure 17C:
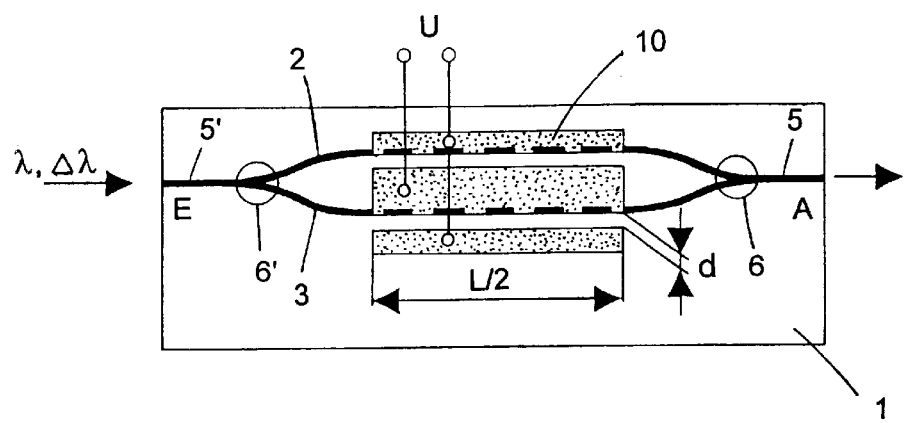

To provide the light capable of interference, which is required at the coupling point 6 in FIG. 17a or 17b, a wideband junction splitter may be used in splitting direction (FIG. 17c).

Light of a wavelength λ or a wavelength range Δλ is applied to an input E of a SOWCW 5'. The SOWCW 5' is split into the SOWCW 2 and 3 at coupling point 6'. Each SOWCW 2 and 3 will then guide light capable of interference. FIG. 17c thus represents a Mach-Zehnder interferometer (MZI) modulator made up of SOWCW.

This wideband modulator operates wavelength-selectively.

Figure 18:
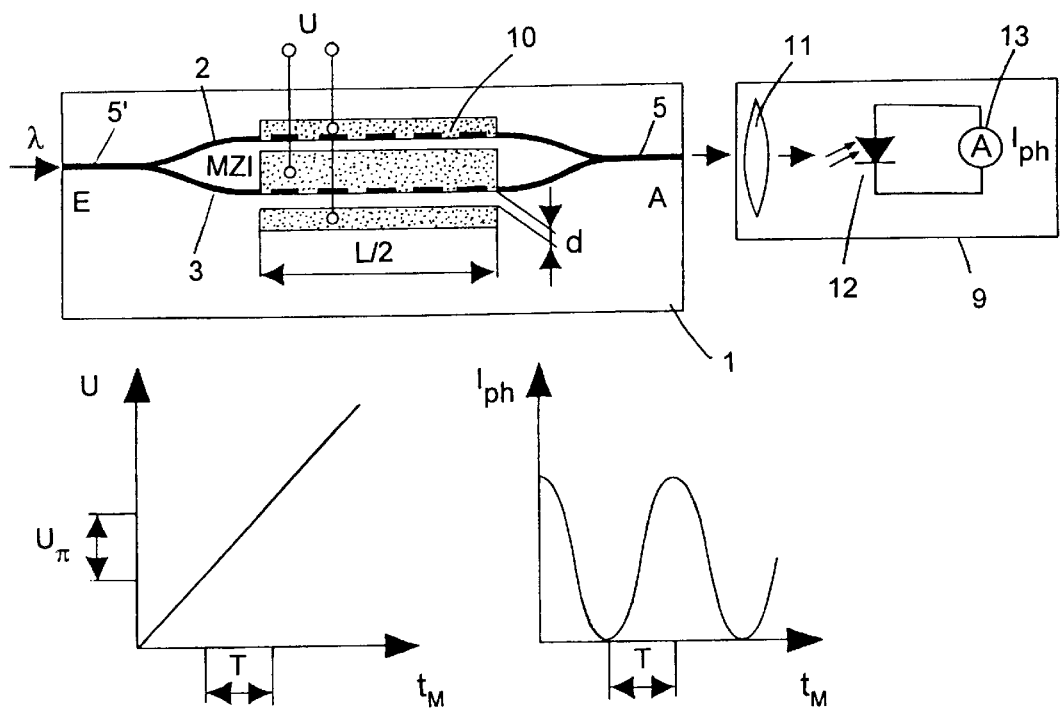
FIG. 18: Wavelength sensor

FIG. 18 shows the wideband junction splitter from FIG. 17c with the provision of interference-capable light by means of a wideband junction splitter in splitting direction. This creates a MZI structure made up of SOWCW which due to its wide bandwidth is used as a wavelength sensor.

Light of the wavelength λ to be determined is injected into input E of the SOWCW 5', which is followed by the integrated-optical MZI structure. Both branches are provided with phase modulators operating in push-pull fashion (electrodes 10). This enables phase modulation of the light components guided in the interferometer arms. If a voltage U applied to the electrodes 10 is changed, the electro-optical effect will cause the phase of the light guided in the interferometer arms to be changed, too, and thus there will also be a change in the amplitude or intensity of the light fed out at output A.

The modulated light will be detected by a measurement device 9.

In this example, the light will fall onto a photodetector 12 by means of which the guided light transmission performance will be determined. The measurement setup consists of a feed-out device 11, which bundles the modulated light onto photodetector 12.

A display unit 13 indicates the light transmission performance measured by the photodetector 12.

The correlation between the electrical modulation voltage and the phase of the guided optical mode in the case of an electro-optical modulator in Z-cut KTP and at TM light (that is, the normal to surface of the substrate, and the direction of the electric field vector of the linearly polarized guided light, correspond to the crystallographic Z axis) are determined by:

$$U = -(\Delta\phi \lambda d)/(\pi L\ n_z^3 r_{33} \Gamma) \tag{1}$$

The half-wave voltage $U_\pi$ thus corresponds to a phase shift of π, according to $$U_\pi = -(\lambda d)/(L\ n_z^3 r_{33} \Gamma) \tag{2}$$

If a ramp voltage (FIG. 18, left-hand diagram) is applied to the electrodes, the photocurrent changes according to the guided light transmission performance at the modulator output (FIG. 18, right-hand diagram).

From this, $U_\pi$ (voltage between a minimum of guided light transmission performance and an adjacent maximum) or a multiple of $U_\pi$ may be determined.

According to (2), $U_\pi$ is dependent on the wavelength. Using a calibration curve $U_\pi=f(\lambda)$, determined during sensor production, the wavelength of the light may be determined by means of measuring the half-wave voltage.

The photocell must ensure—here, in connection with the use of the wideband junction splitter according to the invention—the detectability across the entire wavelength range.

The light source must not emit any wideband light as the line width determines the resolution of the measurement setup, that is, if the resolution is to be fully exploited, line width must be within or below the resolution order of magnitude. Instead of the Mach-Zehnder interferometer structure, integrated-optical interferometer structures, e.g. Michelson interferometer, may also be used. The basic operating principle is analog.

Figure 19:
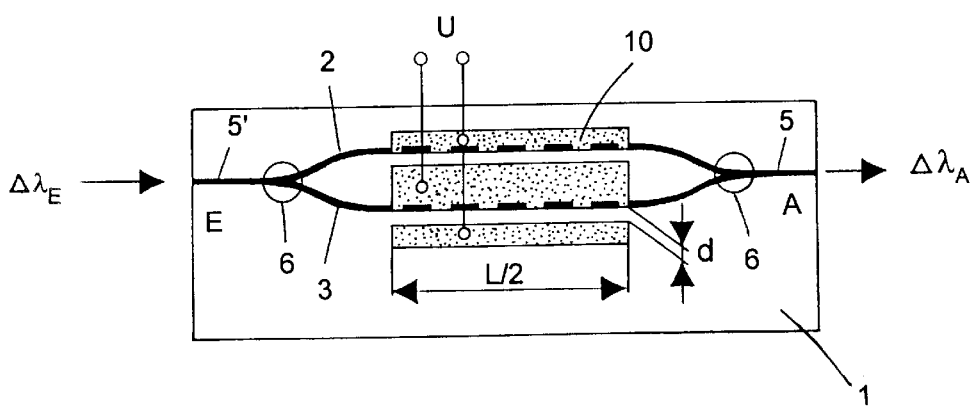
FIG. 19: Wavelength-selective amplitude modulator

FIG. 19 shows a wideband optical filter which filters out some light component from a wavelength range $\Delta\lambda_E$. This is effected by means of the wavelength selectivity of the Mach-Zehnder interferometer structure used in the example. The wavelength range $\Delta\lambda_A$, decoupled at the output, contains the remaining part of the wavelength range $\Delta\lambda_E$.

If the wavelength range $\Delta\lambda_E$ is white light, the decoupled wavelength range $\Delta\lambda_A$ corresponds to the complementary color of the light component filtered-out.

Figure 20:
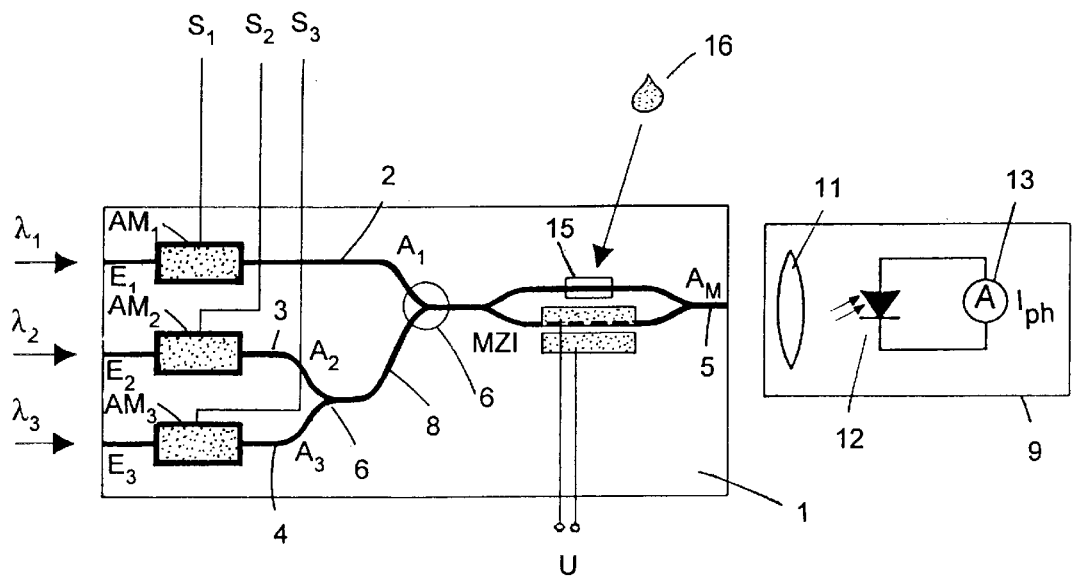
FIG. 20: Refractive index sensor

FIG. 20 shows a miniaturized sensor for spectral determination of refractive indices, which sensor can be operated in wideband fashion. Light of differing wavelengths is spatially combined by means of a wideband junction splitter and then guided through a Mach-Zehnder interferometer structure. The amplitude or intensity modulators $AM_i$ are used to select the required wavelength. One arm of the Mach-Zehnder interferometer MZI is provided with an interaction window 15, similar to FIG. 15; the amount of phase shift when applying the medium to be measured is determined according to the length of this interaction window; the other branch can be provided with a phase modulator in order to increase measurement precision and to determine the direction of the refractive index difference between the superstrate without and/or with the medium to be measured 16.

When applying the medium to be measured 16, the propagation constant of the guided wave is changed due to the changed refractive index of the superstrate; this causes a change in phase, which can be determined interferometrically. The interferometer converts this change in phase into an amplitude signal or intensity signal. From the refractive index differences, it is possible to determine substances or their concentration. The number of inputs is determined by the number of different wavelengths of fixed coupled light sources. If a light source is used which is capable of providing selectively the light of several wavelengths, only one input will be required.

Figure 21:
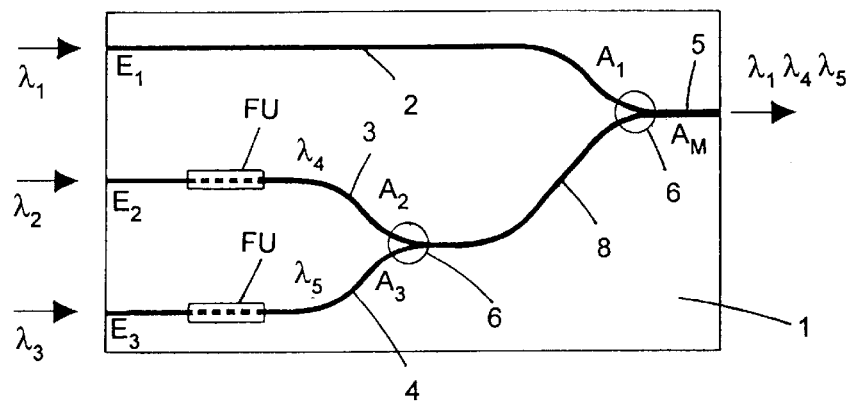
FIG. 21: Wideband junction splitter complete with frequency converters for the spatial combination of light components FIG. 22. Wideband junction splitter for generating light components of differing wavelengths from the light of one wavelength

FIG. 21 and FIG. 22 show devices with SOWCW, which are suitable for generating and spatially combining light components of differing wavelengths. If laser diodes need to be used as light sources, the provision of the blue and green lights in this format is currently not yet possible. To this end, the principle for generating the second harmonic may be applied, if non-linear optically active materials are used (e.g. KTP). Between pumping wave and the second harmonic, phase-matching must be achieved. In KTP, the principle of quasi-phase-matching (QPM) is used.

To this end a piece of the waveguide is segmented in order to cause a ferro-electric domain inversion. In this way, phase-matching between pumping lightwave and harmonic lightwave is achieved. Pumping light of sufficient power is then capable of generating light of half the wavelength that is, e.g., the laser diode light with a wavelength of 830 nm is transformed into light with a wavelength of 415 nm. Further higher harmonics can be generated, e.g. light of wavelength $\lambda/4$.

A further variant for frequency conversion is the sum frequency generation (SFG) or difference frequency generation. Both variants can be carried out in KTP (e.g. M. L. Sundheimer, A. Villeneuve, G. I. Stegemann, and J. D. Bierlein, "*Simultaneous generation of red, green and blue light in a segmented KTP waveguide using as single source*", Electronics letters, 9th Jun. 1994, vol. 30, No. 12, pp. 975–976). By means of both variants, it is possible for instance to convert infrared light into visible light of different discrete wavelengths.

According to FIG. 21, devices for frequency conversion FU are respectively fitted to one each of the SOWCW 3 and 4. The wavelength $\lambda_2$ will be transformed into wavelength $\lambda_4$, and the wavelength $\lambda_3$ will be transformed into wavelength $\lambda_5$. The wavelengths $\lambda_1$, $\lambda_4$, and $\lambda_5$ are provided as spatially combined light at mixed signal output $A_M$. Which and how many SOWCW will be fitted with frequency conversion devices FU, will depend on the relevant use of the wideband junction splitter.

According to FIG. 22, light of wavelength $\lambda_0$ enters into wideband junction splitters operating in splitting mode. Light components of wavelength $\lambda_0$ enter into the SOWCW 2', 3+, and 4'. In each of the SOWCW 2', 3', and 4', a frequency conversion device FU is located.

Figure 22A:
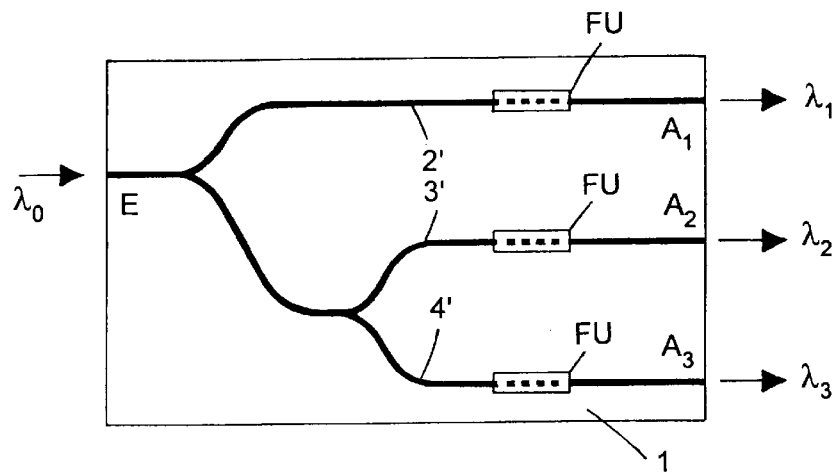
Figure 22B:
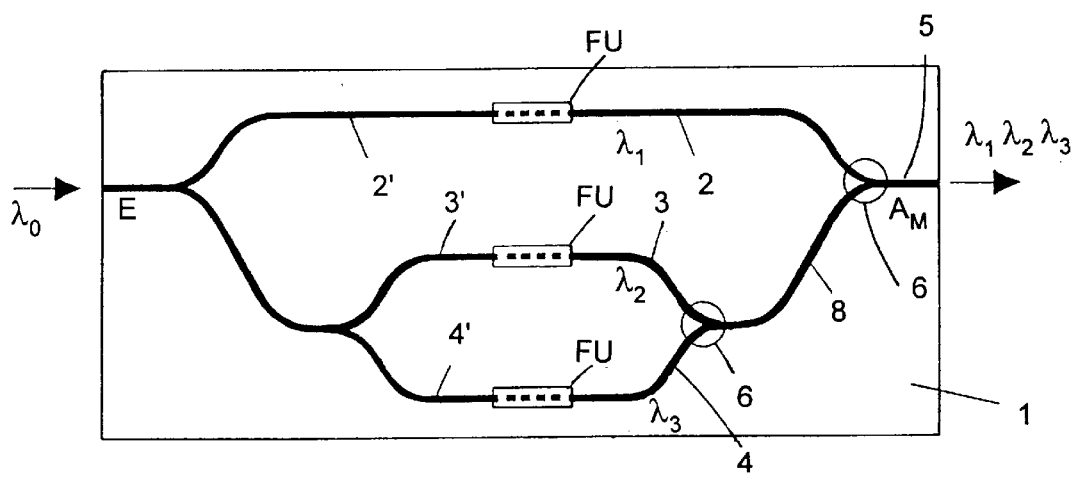

Each frequency conversion device FU respectively generates the wavelength $\lambda_1$, $\lambda_2$, and $\lambda_3$. In FIG. 22a, the light components of wavelengths $\lambda_1$, $\lambda_2$, and $\lambda_3$ may be decoupled. In FIG. 22b, these light components are spatially combined in the following wideband junction splitters in junction mode.

Spatially combined light of wavelengths $\lambda_1$, $\lambda_2$, and $\lambda_3$ is provided at output $A_M$.

FIG. 23 shows integrated-optical sensors for measuring any changes in the length and/or refractive index values.

The sensors are implemented by means of an integrated-optical Michelson interferometer structure using SOWCW as waveguides.

FIG. 23a uses two single wideband Y-junction splitters.

Figure 23C:
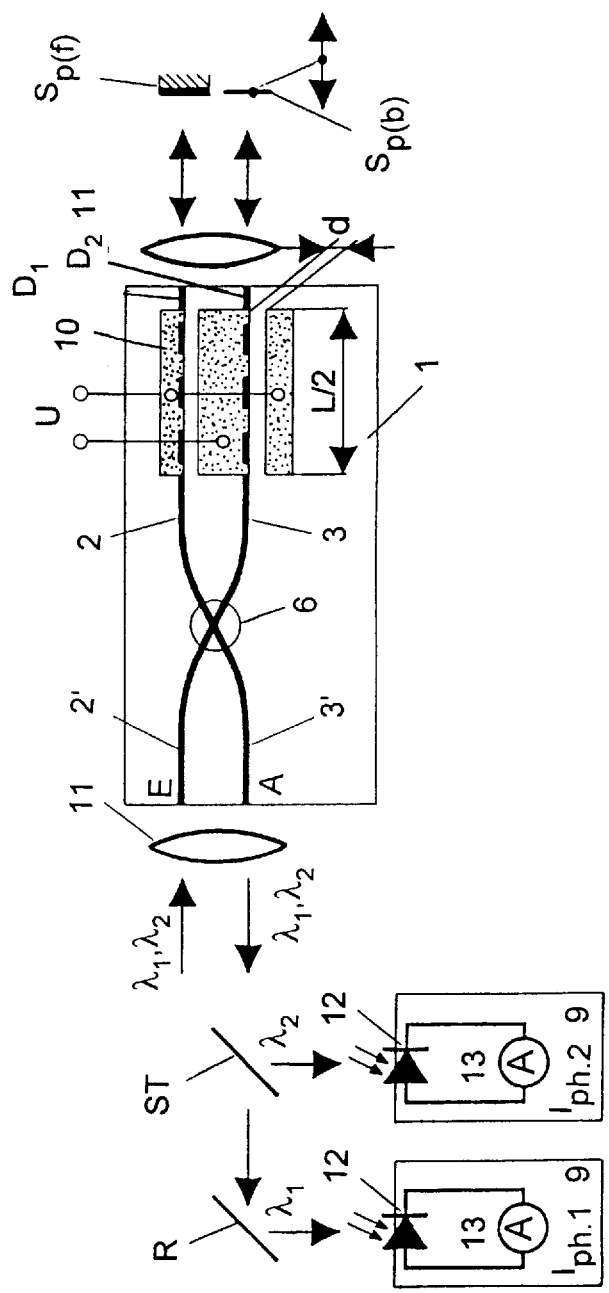
FIG. 23: Sensor for measuring length and refractive index changes

FIG. 23b uses a directional coupler, and FIG. 23c uses an X-coupler or a BOA.

The operating principle of the sensor for measuring length changes is the same in all the examples. Light of a wavelength $\lambda_1$ is injected into input E of the SOWCW 2'. At coupling point 6' (FIG. 23a) or at coupling point 6 (FIGS. 23b and 23c), the light is divided into two waveguide arms and decoupled at the detector outputs $D_1$ and $D_2$. By means of the decoupling device 11, this light is directed onto two mirrors. One mirror Sp(f) is in a fixed position. In place of this mirror, it is also possible to apply a reflecting coating to a waveguide end surface, or an integrated-optical reflector in the SOWCW can be positioned ahead of the waveguide output. The second mirror Sp(b) is mounted on the movable object to be measured.

By means of the mirrors, the light components are reflected back into waveguide outputs $D_1$ and $D_2$, and brought to interference on their second path through the waveguide structure in coupling point 6' (FIG. 23a) or in coupling point 6 (FIG. 23b and 23c).

The superimposed light is divided again and may be decoupled at output A as well as at input E. The light which may be decoupled at output A is directed onto a photodetector 12, in which a photocurrent $I_{ph}$ is generated.

If the optical path length in the decoupling branch between $D_2$ and Sp(b) is now changed, the phasing between the two reflected and recoupled light components also changes, and thus also the amplitude or intensity of the signal applied to the photodetector. A change in position of $\lambda/2$ of the mirror Sp(b) in beam direction corresponds to a full modulation of the photocurrent $I_{ph}$.

For an additional use of a phase modulator in the waveguide branches, provided for in FIGS. 23a to c, and implemented in this example by the electrodes 10 applied to the SOWCW, and/or simultaneous injection of the light of two wavelengths $\lambda_1$ and $\lambda_2$ in the SOWCW 2' and wavelength-selective measurement, a direction detection in respect of the phase change is provided.

By using SOWCW, it is furthermore possible to implement an increase in resolution capability by means of the option for using shorter wavelengths. Currently, no channel waveguide is known, in which light from the wavelength area of the blue light or even shorter wavelengths can be guided and modulated in single-mode.

If mirror Sp(b) is fixed and a measurement medium is inserted between the mirror Sp(b) and detector output $D_2$, then this represents a sensor for determining the refractive index of the measurement medium.

While the foregoing description and drawings represent the preferred embodiments of the present invention, it will be obvious to those skilled in the art that various changes and modifications may be made therein without departing from the true spirit and scope of the present invention.

| | Reference Symbols |
|---|---|
| 1. | Substrate |
| 2. | SOWCW or channel waveguides |
| 3. | SOWCW or channel waveguides |
| 4. | SOWCW or channel waveguides |
| 5. | Common SOWCW. |
| 6. | Coupling point |
| 7. | Controllable unit for the spatial combination of beams and/or beam deviation |
| 8. | SOWCW or channel waveguides |
| 9. | Measurement device |
| 10. | Electrodes |
| 11. | Decoupling device (outcoupling device) |
| 12. | Photodetector |
| 13. | Display unit |
| 14. | Interaction cell |
| 15. | Interaction window |
| 16. | Medium to be measured |
| 17. | Titanium indiffused channel waveguide in $LiNbO_3$ |
| 18. | Titanium strip |
| $L_1, L_2, L_3$ | Light sources |
| $MZI_1, MZI_2, MZI_3$ | Mach-Zehnder interferometer |
| $AM_1, AM_2, AM_3, AM_4$ | Amplitude modulators |
| $E, E_1, E_2, E_3$ | Light inputs |
| $A, A_1, A_2, A_3$ | Light outputs |
| $S_1, S_2, S_3$ | Control signals |
| $U_1, U_2, U_3$ | Control voltages |
| $R, R_1, R_2$ | Integrated-optical or micro-optical reflectors |
| M | Mixed signal |
| $A_M$ | Mixed signal output |
| U | Electrode voltage |
| $I_{ph}$ | Photocurrent |
| $\Delta\phi$ | Electro-optically generated change in phase |
| d | Electrode gap |
| L | Overall electrode length |
| $n_Z$ | Refractive index for Z-polarized light |
| $r_{33}$ | Component of the linear electrooptical tensor $r_{ik}$ connecting the external electrical field in Z-direction with the refractive index for Z-polarized light |

-continued

| | Reference Symbols |
|---|---|
| $\Gamma$ | Overlap factor between the external electrical field of the electrodes and the internal electrical field of the guided optical mode |
| T | Time interval |
| $t_M$ | Measuring time (axis) |
| ST | Wavelength selective beam-splitter |
| Sp(f) | Fixed mirror |
| Sp(b) | Movable mirror |
| $D_1, D_2$ | Channel waveguide outputs for detection |
| $D_x, D_y, D_z$ | Diffusion constants |
| $N_{00}$ | Effective refractive index of the fundamental mode of the channel waveguide |
| $N_{01}$ | Effective refractive index of the first mode in lateral direction of the channel waveguide |
| $N_{10}$ | Effective refractive index of the first mode in depth direction of the channel waveguide |
| $N_{02}$ | Effective refractive index of the second mode in lateral direction of the channel waveguide |
| $N_{eff}$ | Effective refractive index of the channel waveguide mode |
| $N_{eff, z}$ | Effective refractive index of the Z-polarized mode of the channel waveguide |
| $a_x$ | Intermediate value of a length in x-direction |
| $a_y$ | Intermediate value of a length in y-direction |
| a | Width of the structure or the refractive index profile, respectively |
| t | Depth (height) of the structure or the refractive index profile, respectively |
| w | Starting width of the titanium strip for the indiffusion |
| $t_d$ | Diffusion time |
| x-y-z | Coordinate system |
| $n_w$ | Distribution of the refractive index in the waveguiding region $n_w = f(x,y)$ |
| $n_1$ | Refractive index of the substrate |
| $n_2$ | Refractive index of the waveguiding region at the surface |
| $n_3$ | Refractive index of the superstrate |
| $n_s$ | Refractive index of the substrate if $n_1 > n_3$ or refractive index of the superstrate if $n_3 > n_1$ |
| $d(n_2 - n_s)/d\lambda$ | Wavelength dependence (dispersion) of the increase of the refractive index necessary for optical waveguiding |
| Z | Crystallographic Z-axis (or c-axis) |
| $\lambda_0, \ldots, \lambda_6$ | Wavelengths |
| $\lambda_a$ | Shortest singlemode-guidable wavelength in the channel waveguide |
| $\lambda_b$ | oscillation build-up wavelength for the second mode in lateral direction in the widened coupling region |
| $\lambda_{min}$ | Minimum wavelength of the optically transmitting range of a substrate material |
| $\lambda_{max}$ | Maximum wavelength of the optically transmitting range of a substrate material |
| $\lambda_i$ | Discrete wavelengths |
| $\Delta\lambda, \Delta\lambda_i$ | Wavelength ranges |
| $\Delta\lambda_w$ | Bandwidth of channel waveguide |
| $\Delta\lambda_v$ | Wavelength range between the oscillation build-up of the fundamental mode $N_{00}$ in the channel waveguide and the oscillation build-up of the second mode in lateral direction $N_{02}$ in the widened coupling region of the junction splitter |
| $\Delta\lambda_N$ | Efficient usable wavelength region of the junction splitter |
| $\Delta\lambda_E$ | Bandwidth (spectrum) of light at the channel waveguide input |
| $\Delta\lambda_A$ | Bandwidth (spectrum) of light at the channel waveguide output |
| $K_{ij}$ | Element in the matrix of intersection points |

What is claimed is:

1. A junction splitter having channel waveguides for the spatial combination or splitting or switching or deflection or modulation of light, for applications within the wavelength range of visible light, comprising at least three channel waveguides, comprising:

at least one single-mode integrated-optical wideband channel waveguide (SOWCW) where in or on a surface-type substrate material, by a process for changing the refractive index, a channel-shaped structure is fabricated or a channel-shaped structure made from a suitable material is applied, with the geometric/substance parameters of the channel waveguide thus created being set in dependence of the wavelength ranges to be transmitted in the UV, visible, and/or IR regions, so that in relation to the wavelength ($\lambda$) a minimum width of the wavelength range for single-mode light guidance is given by the equation $$\Delta\lambda_w = 0.48 \times \lambda - 85 \text{ nm}$$

where the parameters substrate refractive index ($n_1$), superstrate refractive index (($n_3$,)), refractive index of the refractive index distribution ($f(x,y)$) on the surface (($n_2$,)), refractive index distribution in the waveguiding region, cross-sectional shape (width a and depth t) of the channel waveguide and its location in and/or on the substrate are dimensioned such that single-mode operation of the channel waveguide in the wavelength range $$\Delta\lambda_w > 0.48 \times \lambda - 85 \text{ nm}$$

is ensured, so that to each given wavelength ($\lambda$) in the range between $\lambda_a$ and $\lambda_a + \Delta\lambda_w$, one and only one effective refractive index, can be allocated, and the single-mode range will be determined by efficient oscillation build-up of fundamental mode $N_{00}$ at wavelength $\lambda_a + \Delta\lambda_w$ on the one hand, and by efficient oscillation build-up, in a technical sense of the first mode in lateral direction ($N_{01}$) or of the first mode in depth direction ($N_{10}$) at wavelength $\lambda_a$ on the other hand, and with transmission at a technically sufficient degree of effectiveness signifying that the effective refractive index $N_{eff}$ of the mode guided in the channel waveguide must be at least $5 \times 10^{-5}$ above the refractive index of the surrounding material $n_s$, where $n_s$ where $n_s$ designates the value of substrate index $n_1$ or superstrate index $n_3$, whichever is the greater, and with the minimum possible value of the usable wavelength ($\lambda_{min}$) and the maximum possible value of the usable wavelength ($\lambda_{max}$) being determined by the transmission range of the materials used, and thus the channel waveguide being defined as a single-mode integrated-optical wideband channel waveguide (SOWCW), and wherein there is provided a combination and connection of the minimum of three channel waveguides, in which the geometric/substance parameters of the channel waveguides themselves as well as the media surrounding the channel waveguides which are set in dependence of the wavelength range to be transmitted in the UV, visible, and/or IR regions, so that in relation to the wavelength ($\lambda$) the minimum width of the wavelength range for efficient junction splitter operation is given by the equation $$\Delta\lambda_v > 0.27 \times \lambda - 34 \text{ nm}$$

where the parameters substrate refractive index ($n_1$), superstrate refractive index ($n_3$), refractive index of the refractive index distribution ($f(x,y)$) on the surface ($n_2$), refractive index distribution in the waveguiding region, geometry of the junction splitter, and its location in and/or on the substrate are dimensioned such that efficient operation of the junction splitter is at least ensured in the wavelength range $$\Delta\lambda_v > 0.27 \times \lambda - 34 \text{ nm}$$

with the usable wavelength range $\Delta\lambda_N$ for the efficient operation of the junction splitter, in a technical sense is determined by the lesser value of one of the difference between wavelength $\lambda_a + \Delta\lambda_w$ of the efficient oscillation build-up, in a technical sense, of the fundamental mode ($N_{oo}$) in the channel waveguide and wavelength $\lambda_a$ of the efficient oscillation build-up, in a technical sense, of the first mode in lateral direction ($N_{o1}$) or of the first mode in depth direction ($N_{10}$) in the channel waveguide, and the difference between wavelength $\lambda_a + \Delta\lambda_w$ of the efficient oscillation build-up, in a technical sense, of the fundamental mode ($N_{oo}$) in the channel waveguide and wavelength $\lambda_b$ of the efficient oscillation build-up, in a technical sense, of the second mode in lateral direction in the coupling area, widened in relation to the channel waveguide, of the junction splitter ($N_{02}$), that is by $$\Delta\lambda_N \leq \begin{cases} (\lambda_a + \Delta\lambda_w) - \lambda_a = \Delta\lambda_w \\ (\lambda_a + \Delta\lambda_w) - \lambda_b = \Delta\lambda_v \end{cases}$$

and so that the junction splitter of at least three channel waveguides, comprising at least one SOWCW, is defined as an integrated-optical wideband junction splitter.

2. The junction splitter according to claim 1, in which
at least two channel waveguides each have a respective input into which light may be injected, and which are combined into a common channel waveguide at outputs thereof in a coupling point, and where the common channel waveguide is a single-mode integrated-optical wideband channel waveguide, that is, a SOWCW, which is provided with a common usable light output for spatially combined light.

3. The junction splitter according to claim 1, in which
at least one channel waveguide is intersected by at least one further channel waveguide, and where this minimum of one intersection point is
a) fully passive, or
b) a coupling point for the spatial combination of light components, or
c) a controllable coupling unit for the spatial combination of beams and/or deviation of beams, and furthermore it is possible to inject light into each channel waveguide, and the common channel waveguide is a single-mode integrated-optical wideband channel waveguide, that is, a SOWCW, which is provided with a common usable light output ($A_M$) for spatially combined light.

4. The junction splitter according to claim 1, in which
at least two channel waveguides each have a respective input into which light may be injected, and in which
the minimum of two channel waveguides have an intersection point, and in which
at the intersection point of channel waveguide and channel waveguide an integrated-optical reflector is located, forming the coupling point, and in which
the common channel waveguide is a single-mode integrated-optical wideband channel waveguide, that is, a SOWCW, which is provided with a common usable light output for spatially combined light.

5. The junction splitter according to claim 1, in which all channel waveguides are designed as single-mode integrated-optical wideband channel waveguides (SOWCW).

6. The junction splitter according to claim 1, in which at least one channel waveguide consists of rubidium⇌potassium ion exchanged potassium titanyl phosphate (KTiOPO$_4$ KTP), where the geometric and substance parameters can be set such that a single-mode operation of the channel waveguide within the wavelength range $$\Delta\lambda_w > 0.48 \times \lambda - 85 \text{ nm}$$

(with λ and $\Delta\lambda_w$ being stated in mn) is ensured, this channel waveguide thus being a SOWCW, with the minimum possible value of the usable wavelength ($\lambda_{min}$ approximately 350 nm) and the maximum possible value of the usable wavelength ($\lambda_{max}$ approximately 4 μm) being determined by the optical transmission range of KTiOPO$_4$, and with, in particular, the wavelength range ($\Delta\lambda_w$) of the SOWCW to be transmitted in single-mode in the visible light wavelength spectrum comprising a wavelength range greater than 350 nm, and with the SOWCW being thus defined as a single-mode white light channel waveguide, and which in conjunction with two further channel waveguides forms a wideband integrated-optical junction splitter, and where in particular the usable wavelength range $\Delta\lambda_N$ for efficient operation of the junction splitter within the visible light wavelength range comprises a wavelength range greater than 300 nm, and with the junction splitter being thus defined as a white light junction splitter.

7. The junction splitter according to claim 1, in which at least two channel waveguides are connected at each input with one light source respectively, and in which each light source emits light of a different wavelength or of different wavelength ranges.

8. The junction splitter according to claim 1, in which at least one channel waveguide is connected at its input or its output with at least one light source, and in which each light source emits light of at least one wavelength or at least one wavelength range into at least one channel waveguide.

9. The junction splitter according to claim 1, in which at least one channel waveguide is provided with a modulation device which modulates, in dependence of the wavelength or wavelength-independently, phase, amplitude or intensity and/or polarization direction of light components.

10. The junction splitter according to claim 1, in which the coupling point (6) created by combining the outputs of the channel waveguides is a controllable unit for spatial beam combination and/or beam deviation by means of which at least one of the light components can be applied to the common SOWCW and/or modulated.

11. The junction splitter according to claim 9, in which the modulation device and/or the controllable unit for spatial beam combination and or bealn deviation is based on a principle selected from a group consisting of the following principles:

a) modulation by electric fields, that is, electro-optical light modulation by means of an integrated-optical interferometer structure, b) modulation by pressure waves, that is, acousto-optical light modulation by means of an integrated-optical interferometer structure, c) modulation by heat, that is, thermo-optical light modulation by means of an integrated-optical interferometer structure, d) modulation by magnetic fields, that is, mapleto-optical light modulation by means of an integrated-optical interferometer structure, e) modulation by light radiation, that is, opto-optical light modulation by means of an integrated-optical interferometer structure, f) modulation by heat radiation, that is, photo-thermal light modulation by means of an integrated-optical interferometer structure, g) modulation by electric charge carriers, that is, modification of the effective refractive index by injection or depletion of free charge carriers in semiconductor materials, in comlection with an integrated-optical interferometer structure, h) electro-optical, acousto-optical, thermo-optical, magneto-optical, optooptical, or photo-thermal modulation using the Fabry-Perot effect, i) modulation by changing the effective refractive index by means of injection or depletion of free charge carriers in semiconductor materials, using the Fabry-Perot effect, j) electro-optical, acousto-optical, thermo-optical, magneto-optical, optooptical, or photo-thermal cut-off modulation, k) cut-off modulation on the basis of the change in the effective refractive index as a result of the injection or depletion of the free charge carriers in semiconductor materials, l) controllable waveguide amplification, m) controllable polarization conversion in COlljUnCtiOll with a polarizing evice or polarizing channel waveguide, n) waveguide mode conversion, o) electro-absorption modulation, and p) modulation with the assistance of an integrated-optical switching or distributor element, such as an X-coupler, three-guide coupler, directional coupler or BOA.

12. The junction splitter according to claim 1, in which on the surface-type substrate at least two channel waveguides run parallel in one direction and at least one further channel waveguide runs in another direction, and where the intersection points of the channel waveguides form a matrix.

13. A method of using a wideband junction splitter comprising the steps of:

using a junction splitter having channel waveguides for the spatial combination or splitting or switching or deflection or modulation of light, for applications within the wavelength range of visible light, having at least three channel waveguides, having:

at least one single-mode integrated-optical wideband channel waveguide (SOWCW) where in or on a surface-type substrate material, by a process for changing the refractive index, a channel-shaped structure is fabricated or a channel-shaped structure made from a suitable material is applied, with the geometric/ substance parameters of the channel waveguide thus created being set in dependence of the wavelength ranges to be transmitted in the UV, visible, and/or IR regions, so that in relation to the wavelength (λ) a minimum width of the wavelength range for single-mode light guidance is given by the equation $$\Delta\lambda_w = 0.48 \times \lambda - 85 \text{ nm}$$

where the parameters substrate refractive index ($n_1$,), superstrate refractive index (($n_3$,), refractive index of the refractive index distribution (f(x,y)) on the surface (($n_2$)), refractive index distribution in the waveguiding region, cross-sectional shape (width a and depth t) of the channel waveguide and its location in and/or on the substrate are dimensioned such that single-mode operation of the channel waveguide in the wavelength range $$\Delta\lambda_w > 0.48 \times \lambda - 85 \text{ nm}$$

is ensured, so that to each given wavelength ($\lambda$) in the range between $\lambda_a$ and $\lambda_a + \Delta\lambda_w$ one and only one effective refractive index, can be allocated, and the single-mode range will be determined by efficient oscillation build-up of fundamental mode $N_{oo}$ at wavelength $\lambda_a + \Delta\lambda_w$ on the one hand, and by efficient oscillation build-up, in a technical sense of the first mode in lateral direction ($N_{01}$) or of the first mode in depth direction ($N_{10}$) at wavelength $\lambda_a$ on the other hand, and with transmission at a technically sufficient degree of effectiveness signifying that the effective refractive index $N_{eff}$ of the mode guided in the channel waveguide must be at least $5 \times 10^{-5}$ above the refractive index of the surrounding material $n_s$, where $n_s$ where $n_s$ designates the value of substrate index $n_1$ or superstrate index $n_3$, whichever is the greater, and with the minimum possible value of the usable wavelength ($\lambda_{min}$) and the maximum possible value of the usable wavelength ($\lambda_{max}$) being determined by the transmission range of the materials used, and thus the channel waveguide being defined as a single-mode integrated-optical wideband channel waveguide (SOWCW), and wherein there is provided a combination and connection of the minimum of three channel waveguides, in which the geometric/substance parameters of the channel waveguides themselves as well as the media surrounding the channel waveguides which are set in dependence of the wavelength range to be transmitted in the UV, visible, and/or IR regions, so that in relation to the wavelength ($\lambda$) the minimum width of the wavelength range for efficient junction splitter operation is given by the equation $$\Delta\lambda_v > 0.27 \times \lambda - 34 \text{ nm}$$

where the parameters substrate refractive index ($n_1$), superstrate refractive index ($n_3$), refractive index of the refractive index distribution (f(x,y)) on the surface ($n_2$), refractive index distribution in the waveguiding region, geometry of the junction splitter, and its location in and/or on the substrate are dimensioned such that efficient operation of the junction splitter is at least ensured in the wavelength range $$\Delta\lambda_v > 0.27 \times \lambda - 34 \text{ nm}$$

with the usable wavelength range $\Delta\lambda_N$ for the efficient operation of the junction splitter, in a technical sense is determined by the lesser value of one of the difference between wavelength $\lambda_a + \Delta\lambda_w$ of the efficient oscillation build-up, in a technical sense, of the fundamental mode ($N_{oo}$) in the channel waveguide and wavelength $\lambda_a$ of the efficient oscillation build-up, in a technical sense, of the first mode in lateral direction ($N_{o1}$) or of the first mode in depth direction ($N_{10}$) in the channel waveguide, and the difference between wavelength $\lambda_a + \Delta\lambda_w$ of the efficient oscillation build-up, in a technical sense, of the fundamental mode ($N_{oo}$) in the channel waveguide and wavelength $\lambda_b$ of the efficient oscillation build-up, in a technical sense, of the second mode in lateral direction in the coupling area, widened in relation to the channel waveguide, of the junction splitter ($N_{02}$), that is by $$\Delta\lambda_N \leq \begin{cases} (\lambda_a + \Delta\lambda_w) - \lambda_a = \Delta\lambda_w \\ (\lambda_a + \Delta\lambda_w) - \lambda_b = \Delta\lambda_v \end{cases}$$

and so that the junction splitter of at least three channel waveguides, having at least one SOWCW, is defined as an integrated-optical wideband junction splitter by spatially combining light of at least two differing wavelengths or wavelength ranges for generating fast-changing spectral compositions of light, for color mixing, in a usable spectrum range greater than 75 nm, wherein a minimum of two light components are injected, respectively, into one channel waveguide each, and decoupled from a common SOWCW as spatially combined light.

14. A method of using a wideband junction splitter comprising the steps of:

using a junction splitter having channel waveguides for the spatial combination or splitting or switching or deflection or modulation of light, for applications within the wavelength range of visible light, having at least three channel waveguides, having:

at least one single-mode integrated-optical wideband channel waveguide (SOWCW) where in or on a surface-type substrate material, by a process for changing the refractive index, a channel-shaped structure is fabricated or a channel-shaped structure made from a suitable material is applied, with the geometric/substance parameters of the channel waveguide thus created being set in dependence of the wavelength ranges to be transmitted in the UV, visible, and/or IR regions, so that in relation to the wavelength ($\lambda$) a minimum width of the wavelength range for single-mode light guidance is given by the equation $$\Delta\lambda_w = 0.48 \times \lambda - 85 \text{ nm}$$

where the parameters substrate refractive index ($n_1$,), superstrate refractive index (($n_3$,), refractive index of the refractive index distribution (f(x,y)) on the surface (($n_2$,)), refractive index distribution in the waveguiding region, cross-sectional shape (width a and depth t) of the channel waveguide and its location in and/or on the substrate are dimensioned such that single-mode operation of the channel waveguide in the wavelength range $$\Delta\lambda_w > 0.48 \times \lambda - 85 \text{ nm}$$

is ensured, so that to each given wavelength ($\lambda$) in the range between $\lambda_a$ and $\lambda_a + \Delta\lambda_w$ one and only one effective refractive index, can be allocated, and the single-mode range will be determined by efficient oscillation build-up of fundamental mode $N_{oo}$ at wavelength $\lambda_a + \Delta\lambda_w$ on the one hand, and by efficient oscillation build-up, in a technical sense of the first mode in lateral direction ($N_{01}$) or of the first mode in depth direction ($N_{10}$) at wavelength $\lambda_a$ on the other hand, and with transmission at a technically sufficient degree of effectiveness signifying that the effective refractive index $N_{eff}$ of the mode guided in the channel waveguide must be at least $5 \times 10^{-5}$ above the refractive index of the surrounding material $n_s$, where $n_s$ where $n_s$ designates the value of substrate index $n_1$ or superstrate index $n_3$, whichever is the greater, and with the minimum possible value of the usable wavelength ($\lambda_{min}$) and the maximum possible value of the usable wavelength ($\lambda_{max}$) being determined by the transmission range of the materials used, and thus the channel waveguide being defined as a single-mode integrated-optical wideband channel waveguide (SOWCW), and wherein there is provided a combination and connection of the minimum of three channel waveguides, in which the geometric/substance parameters of the channel waveguides themselves as well as the media surrounding the channel waveguides which are set in dependence of the wavelength range to be transmitted in the UV, visible, and/or IR regions, so that in relation to the wavelength ($\lambda$) the minimum width of the wavelength range for efficient junction splitter operation is given by the equation $$\Delta\lambda_v > 0.27 \times \lambda - 34 \text{ nm}$$

where the parameters substrate refractive index ($n_1$), superstrate refractive index ($n_3$), refractive index of the refractive index distribution (f(x,y)) on the surface ($n_2$), refractive index distribution in the waveguiding region, geometry of the junction splitter, and its location in and/or on the substrate are dimensioned such that efficient operation of the junction splitter is at least ensured in the wavelength range $$\Delta\lambda_v > 0.27 \times \lambda - 34 \text{ nm}$$

with the usable wavelength range $\Delta\lambda_N$ for the efficient operation of the junction splitter, in a technical sense is determined by the lesser value of one of the difference between wavelength $\lambda_a + \Delta\lambda_w$ of the efficient oscillation build-up, in a technical sense, of the fundamental mode ($N_{oo}$) in the channel waveguide and wavelength $\lambda_a$ of the efficient oscillation build-up, in a technical sense, of the first mode in lateral direction ($N_{o1}$) or of the first mode in depth direction ($N_{10}$) in the channel waveguide, and the difference between wavelength $\lambda_a + \Delta\lambda_w$ of the efficient oscillation build-up, in a technical sense, of the fundamental mode ($N_{oo}$) in the channel waveguide and wavelength $\lambda_b$ of the efficient oscillation build-up, in a technical sense, of the second mode in lateral direction in the coupling area, widened in relation to the channel waveguide, of the junction splitter ($N_{02}$), that is by $$\Delta\lambda_N \leq \begin{cases} (\lambda_a + \Delta\lambda_w) - \lambda_a = \Delta\lambda_w \\ (\lambda_a + \Delta\lambda_w) - \lambda_b = \Delta\lambda_r \end{cases}$$

and so that the junction splitter of at least three channel waveguides, having at least one SOWCW, is defined as an integrated-optical wideband junction splitter by splitting light into at least two light components in a usable spectrum range greater than 75 nm, in which a minimum of one light component is injected into an SOWCW, and in which light components from at least two channel waveguides, which have the same spectral composition and phasing as the injected light, are decoupled.

15. A method of using a wideband junction splitter as a wavelength-selective or wavelength-independent wideband switch or wideband modulator for the amplitude or intensity of light of at least one wavelength or one wavelength range for generating fast changing light intensities and/or spectral light compositions in a usable spectrum range greater than 75 nm, comprising the steps of:

using a junction splitter having channel waveguides for the spatial combination or splitting or switching or deflection or modulation of light, for applications within the wavelength range of visible light, having at least three channel waveguides, having:

at least one single-mode integrated-optical wideband channel waveguide (SOWCW) where in or on a surface-type substrate material, by a process for changing the refractive index, a channel-shaped structure is fabricated or a channel-shaped structure made from a suitable material is applied, with the geometric/substance parameters of the channel waveguide thus created being set in dependence of the wavelength ranges to be transmitted in the UV, visible, and/or IR regions, so that in relation to the wavelength ($\lambda$) a minimum width of the wavelength range for single-mode light guidance is given by the equation $$\Delta\lambda_w = 0.48 \times \lambda - 85 \text{ nm}$$

where the parameters substrate refractive index ($n_1$,), superstrate refractive index (($n_3$,), refractive index of the refractive index distribution (f(x,y)) on the surface (($n_2$,)), refractive index distribution in the waveguiding region, cross-sectional shape (width a and depth t) of the channel waveguide and its location in and/or on the substrate are dimensioned such that single-mode operation of the channel waveguide in the wavelength range $$\Delta\lambda_w > 0.48 \times \lambda - 85 \text{ nm}$$

is ensured, so that to each given wavelength ($\lambda$) in the range between $\lambda_a$ and $\lambda_a + \Delta\lambda_w$ one and only one effective refractive index, can be allocated, and the single-mode range will be determined by efficient oscillation build-up of fundamental mode $N_{oo}$ at wavelength $\lambda_a + \Delta\lambda_w$ on the one hand, and by efficient oscillation build-up, in a technical sense of the first mode in lateral direction ($N_{01}$) or of the first mode in depth direction ($N_{10}$) at wavelength $\lambda_a$ on the other hand, and with transmission at a technically sufficient degree of effectiveness signifying that the effective refractive index $N_{eff}$ of the mode guided in the channel waveguide must be at least $5 \times 10^{-5}$ above the refractive index of the surrounding material $n_s$, where $n_s$ where $n_s$ designates the value of substrate index $n_1$ or superstrate index $n_3$, whichever is the greater, and with the minimum possible value of the usable wavelength ($\lambda_{min}$) and the maximum possible value of the usable wavelength ($\lambda_{max}$) being determined by the transmission range of the materials used, and thus the channel waveguide being defined as a single-mode integrated-optical wideband channel waveguide (SOWCW), and wherein there is provided a combination and connection of the minimum of three channel waveguides, in which the geometric/substance parameters of the channel waveguides themselves as well as the media surrounding the channel waveguides which are set in dependence of the wavelength range to be transmitted in the UV, visible, and/or IR regions, so that in relation to the wavelength ($\lambda$) the minimum width of the wavelength range for efficient junction splitter operation is given by the equation $$\Delta\lambda_v > 0.27 \times \lambda - 34 \text{ nm}$$

where the parameters substrate refractive index ($n_1$), superstrate refractive index ($n_3$), refractive index of the refractive index distribution (f(x,y)) on the surface ($n_2$), refractive index distribution in the waveguiding region, geometry of the junction splitter, and its location in and/or on the substrate are dimensioned such that efficient operation of the junction splitter is at least ensured in the wavelength range $\Delta\lambda_v > 0.27 \times \lambda - 34$ nm with the usable wavelength range $\Delta\lambda_N$ for the efficient operation of the junction splitter, in a technical sense is determined by the lesser value of one of the difference between wavelength $\lambda_a + \Delta\lambda_w$ of the efficient oscillation build-up, in a technical sense, of the fundamental mode ($N_{oo}$) in the channel waveguide and wavelength $\lambda_a$ of the efficient oscillation build-up, in a technical sense, of the first mode in lateral direction ($N_{o1}$) or of the first mode in depth direction ($N_{10}$) in the channel waveguide, and the difference between wavelength $\lambda_a + \Delta\lambda_w$ of the efficient oscillation build-up, in a technical sense, of the fundamental mode ($N_{oo}$) in the channel waveguide and wavelength $\lambda_b$ of the efficient oscillation build-up, in a technical sense, of the second mode in lateral direction in the coupling area, widened in relation to the channel waveguide, of the junction splitter ($N_{02}$), that is by $$\Delta\lambda_N \leq \begin{cases} (\lambda_a + \Delta\lambda_w) - \lambda_a = \Delta\lambda_w \\ (\lambda_a + \Delta\lambda_w) - \lambda_b = \Delta\lambda_v \end{cases}$$

and so that the junction splitter of at least three channel waveguides, having at least one SOWCW, is defined as an integrated-optical wideband junction splitter by injecting light into at least one channel waveguide and decoupling at a common SOWCW as spatially combined modulated light.

16. A method of using a wideband junction splitter in an arrangement as a measurement device for physical, chemical, and biological parameters, in which at least one of a light component in a channel waveguide or SOWCW, and spatially combined light in a common SOWCW, and spatially combined light provided at an output of an SOWCW, and waveguiding in one of the channel waveguides or an SOWCW are influenced by a parameter and in which the spatially combined light components are measured photometrically at a point after output of a common SOWCW, said arrangement being in a wavelength sensor, comprising steps of injecting light of an unknown wavelength into a first common SOWCW, the first common SOWCW being split into two SOWCW, and these split SOWCW being spatially combined in a second common SOWCW, and which thus constitutes an integrated-optical interferometer structure, with light intensity being measured at output of the second common SOWCW, and fitting electrodes in a suitable fashion on the split SOWCW, and with the magnitude of the voltage applied to the electrodes—which voltage causes a change in the light transmission performance at output from maximum to an adjacent minimum, or vice versa—being a measure for the wavelength of the light.

17. A junction splitter having channel waveguides for the spatial combination or splitting or switching or deflection of modulation of light for applications within the wavelength range of visible light, comprising at least three channel waveguides, comprising:

at least one single-mode integrated-optical wideband channel waveguide (SOWCW) where in or on a surface-type substrate material having a channel-shaped structure, said structure providing effective refractive indices $N_{eff}$ dependent on wavelength and on different transmission modes of said waveguide and the channel shaped structure providing single mode transmission for each wavelength in a wavelength range of $\Delta\lambda_w > 0.48 \times \lambda - 85$ nm and defining $\lambda_a = \lambda$ for a given channel waveguide wherein $\lambda_a$ and $\Delta\lambda_w$ are defined by $N_{eff}(\lambda_a + \Delta\lambda_w) = 5 \times 10^{-5} + n_s$ for the fundamental mode ($N_{oo}$) and $N_{eff}(\lambda_{a(01)}) = 5 \times 10^{-5} + n_s$ for the first mode in lateral direction ($N_{01}$) and $N_{eff}(\lambda_{a(10)}) = 5 \times 10^{-5} + n_s$ for the first mode in depth direction ($N_{10}$) where $n_s$ is the highest value of the refractive indices of the materials surrounding the waveguide and $\lambda_a = \lambda_{a(01)}$ if $\lambda_{a(01)} \geq \lambda_{a(10)}$ or $\lambda_a = \lambda_{a(10)}$ if $\lambda_{a(01)} < \lambda_{a(10)}$ wherein $\lambda_{a(01)}$ is the wavelength of the efficient oscillation build-up of the first mode in lateral direction ($N_{01}$) and $\lambda_{a(10)}$ is the wavelength of the efficient oscillation build-up of the first mode in depth direction ($N_{10}$) and thus the channel waveguide being defined as a single-mode integrated-optical wideband channel waveguide (SOWCW), and wherein there is provided:

a combination and connection of the minimum of three channel waveguides, providing efficient junction splitter operation in a wavelength range of $\Delta\lambda_v > 0.27 \times \lambda - 34$ nm and defining $\lambda_b = \lambda$ for a given junction splitter wherein $\lambda_b$ is defined by $N_{eff}(\lambda_b) = 5 \times 10^{-5} + n_s$ for the second mode in lateral direction ($N_{02}$) in the coupling area, widened in relation to the channel waveguide, where $n_s$ is the highest value of the refractive indices of the materials surrounding the waveguide wherein $\lambda_b$ is the wavelength of the efficient oscillation build-up of the second mode in lateral direction ($N_{02}$) and $\Delta\lambda_v$ is defined by $\Delta\lambda_v = \lambda_a \Delta\lambda_w - \lambda_b$ where the usable wavelength range $\Delta\lambda_n$ for the efficient operation of the junction splitter is determined by the lesser value of $\Delta\lambda_w$ or $\Delta\lambda_v$.

* * * * *